United States Patent
Yatabe et al.

(10) Patent No.: US 9,286,840 B2
(45) Date of Patent: Mar. 15, 2016

(54) LIQUID CRYSTAL DISPLAY DEVICE, METHOD FOR DRIVING LIQUID CRYSTAL DISPLAY DEVICE, AND ELECTRONIC APPARATUS

(71) Applicant: SEIKO EPSON CORPORATION, Tokyo (JP)

(72) Inventors: Satoshi Yatabe, Shiojri (JP); Kazuhisa Mizusako, Shiojiri (JP); Nariya Takahashi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/529,555

(22) Filed: Oct. 31, 2014

(65) Prior Publication Data

US 2015/0123959 A1 May 7, 2015

(30) Foreign Application Priority Data

Nov. 1, 2013 (JP) .................... 2013-227962

(51) Int. Cl.
*G09G 3/36* (2006.01)

(52) U.S. Cl.
CPC ............ *G09G 3/3614* (2013.01); *G09G 3/3666* (2013.01)

(58) Field of Classification Search
CPC .............. G09G 3/3614; G09G 3/3659; G09G 2310/0202; G09G 2310/0278; G09G 2320/0233
USPC ................... 345/87, 89, 98, 100, 204
See application file for complete search history.

(56) References Cited

U.S. PATENT DOCUMENTS

| | | | | |
|---|---|---|---|---|
| 2007/0046610 | A1* | 3/2007 | Okuzono | G09G 3/3614 345/96 |
| 2010/0118058 | A1* | 5/2010 | Murai | G09G 3/3648 345/690 |
| 2014/0085279 | A1* | 3/2014 | Shiomi | G09G 3/2074 345/204 |

FOREIGN PATENT DOCUMENTS

JP          2008-070406 A          3/2008

* cited by examiner

*Primary Examiner* — Jennifer Nguyen
(74) *Attorney, Agent, or Firm* — Maschoff Brennan

(57) ABSTRACT

A liquid crystal display device supplies an active scan signal to each scan line while skipping a portion of a plurality of the scan lines, per one horizontal scan period, in a direction of the m-th to the first scan lines, by a first scan line drive circuit, and supplies the active scan signal to each scan line while skipping the portion of the plurality of the scan lines, per one horizontal scan period, in a direction of the m+1-th to the 2m-th scan lines, by a second scan line drive circuit. Therefore, the liquid crystal display device synchronizes with a timing of supplying the active signal with the first scan line drive circuit and the second scan line drive circuit, and supplies a data signal whose polarity is inverted to a positive polarity potential and a negative polarity potential per one horizontal scan period, to a data line.

7 Claims, 15 Drawing Sheets

LIQUID CRYSTAL DISPLAY DEVICE, METHOD FOR DRIVING LIQUID CRYSTAL DISPLAY DEVICE, AND ELECTRONIC APPARATUS

BACKGROUND

1. Technical Field

The present invention relates to a technical field of a liquid crystal display device, a method for driving a liquid crystal display device, and an electronic apparatus such as a liquid crystal projector that is configured to include the liquid crystal display device.

2. Related Art

In a liquid crystal display panel with high resolution and high definition, there is a case where the number of scan lines is increased, and a contrast is lowered by a scan system, and thus, various methods to improve this have been proposed. For example, the method of dividing the liquid crystal display panel into two screens above and below, and, in order to prevent a joint portion of the two screens from being displayed, applying an active scan voltage is applied with respect to the first to the m-th scan lines which are arranged in a first region, in order, per one horizontal scan period, and after completing the application of the active scan voltage to the m-th scan line, applying the active scan voltage is applied with respect to the m+1-th to the 2m-th scan lines which are arranged in a second region, in order, per one horizontal scan period, has been proposed (for example, JP-A-2008-70406).

However, in a device of JP-A-2008-70406, at the time of driving an active system 3D (three-dimensional display), or at the time of driving a field sequential, since a time which is necessary for rewriting of one screen, is relevant to an amount which is obtained by multiplying the total number of scan lines in one horizontal scan period, it is necessary to shorten a shutter open time of 3D (three-dimensional display) glasses, or, a lighting time of an RGB light source. Moreover, as the device of JP-A-2008-70406, when the first region is scanned from above toward below, and, further, the second region is subsequently scanned from above toward below, a phenomenon where an upper and lower luminance difference occurs per a region, and the luminance difference is emphasized in a boundary unit of the first region and the second region, occurs.

SUMMARY

An advantage of some aspects of the invention is to provide a liquid crystal display device, a method for driving a liquid crystal display device, and an electronic apparatus including the liquid crystal display device without occurring a luminance difference in a boundary unit of a first region and a second region while shortening a time which is necessary for rewriting of one screen, even at the time of driving an active system 3D (three-dimensional display), or at the time of driving a field sequential.

According to an aspect of the invention, there is provided a liquid crystal display device including a liquid crystal display panel that has a first region and a second region, the first to the m-th scan lines that are arranged in the first region, the m+1-th to the 2m-th scan lines that are arranged in the second region, n data lines intersecting with the scan lines which are arranged in the first region, n data lines intersecting with the scan lines which are arranged in the second region, pixels that are installed to correspond to intersection of the scan lines and the data lines respectively, in each of the first region and the second region, a first scan line drive circuit that drives from the first to the m-th scan lines, a second scan line drive circuit that drives from the m+1-th to the 2m-th scan lines, a first data line drive circuit that drives the data line intersecting with the first to the m-th scan lines, and a second data line drive circuit that drives the data line intersecting with the m+1-th to the 2m-th scan lines, in which the first scan line drive circuit supplies an active scan signal to each scan line while skipping a portion of a plurality of the scan lines, per one horizontal scan period, in a direction of the first to the m-th scan lines, or in a direction of the m-th to the first scan lines, the second scan line drive circuit supplies the active scan signal to each scan line while skipping the portion of the plurality of the scan lines, per one horizontal scan period, in a direction of the 2m-th to the m+1-th scan lines which is a direction opposite to the supply direction of the scan signal to the scan line by the first scan line drive circuit, or in a direction of the m+1-th to the 2m-th scan lines, and the first data line drive circuit and the second data line drive circuit synchronize with a timing of supplying the active signal by the first scan line drive circuit and the second scan line drive circuit, and supply a data signal whose polarity is inverted to a positive polarity potential and a negative polarity potential per one horizontal scan period, to the data line.

According to this aspect, in the first region, when the active scan signal is supplied to each scan line in the direction of the m-th to the first scan lines, in the second region, the active scan signal is supplied to each scan line in the direction of the m+1-th to the 2m-th scan lines which is the direction opposite to the first region. Moreover, in the first region, when the active scan signal is supplied to each scan line in the direction of the first to the m-th scan lines, in the second region, the active scan signal is supplied to each scan line in the direction of the 2m-th to the m+1-th scan lines which is the direction opposite to the first region. In this manner, in the first region and the second region, since the scan direction is made to be the direction opposite to each other, in comparison with a case of performing the scan in the direction of the m+1-th to the 2m-th scan lines in the second region after performing the scan in the direction of the first to the m-th scan lines in the first region, it is possible to shorten the time which is necessary for rewriting of one screen. Furthermore, since the scan direction in the first region and the second region is the direction which is from the scan line close to the boundary unit of the first region and the second region, to the far scan line, or the direction which is from the scan line far from the boundary unit, to the close scan line, it is possible to suppress the luminance difference in the boundary unit.

Moreover, according to this aspect, in the first region and the second region, when the scan of the scan lines is performed, the scan is not performed in order according to a layout of the scan lines, and each scan line is scanned while skipping the portion of the plurality of the scan lines. In company therewith, the first data line drive circuit and the second data line drive circuit synchronize with a timing of the scan, and supply the data signal whose the polarity is inverted to the positive polarity potential and the negative polarity potential per one horizontal scan period, to the data line. As a result, a period in which the voltage to an switching element of the pixel corresponding to each scan line is biased to either of large and small according to a bias of the polarity, is shortened, and thus, it is possible to make a leakage current amount of the switching element of the pixel uniform on the whole, and it is possible to suppress an upper and lower luminance difference itself.

In the liquid crystal display device according to the aspect described above, the second scan line drive circuit may move the timing of supplying the active scan signal to each scan line while skipping the portion of the plurality of the scan lines, in the direction of the 2m-th to the m+1-th scan lines, or in the direction of the m+1-th to the 2m-th scan lines, before or after as only two horizontal scan periods from the timing of supplying the active scan signal to each scan line while skipping the portion of the plurality of the scan lines by the first scan line drive circuit, in the direction of the first to the m-th scan lines, or in the direction of the m-th to the first scan lines. According to the aspect, since a start timing of the scan is moved as two horizontal scan periods in the first region and the second region, a horizontal electric field occurs not only between all scan lines but also between the boundary unit of the first region and the second region and the scan lines. In the whole screen which is made up of the first region and the second region, the horizontal electric field occurs as the same period, and thus, an occurrence amount of a reverse twist domain is the same level. As a result, in comparison with a case of occurring no reverse twist domain only in the boundary unit of an upper side pixel area 30U and a lower side pixel area 30L, it is possible to prevent the boundary unit from being emphasized.

In the liquid crystal display device according to the aspect described above, the first data line drive circuit may drive the data lines in order of the first to the n-th data lines, in the first region, the second data line drive circuit may drive the data lines in order of the first data line corresponding to the first data line of the first region to the n-th data line corresponding to the n-th data line of the first region, in the second region, and the data signal having the same polarity may be supplied to the data line corresponding to the first region and the second region. According to the aspect, since the polarity of the applied voltage is made uniform in each line of the data lines in the whole screen which is made by combining the first region and the second region, the start timing of the scan is moved in the first region and the second region, and thereby, it is possible to adjust an occurrence position and a period of the horizontal electric field.

According to another aspect of the invention, there is provided a method for driving a liquid crystal display device which includes a liquid crystal display panel that has a first region and a second region, the first to the m-th scan lines that are arranged in the first region, the m+1-th to the 2m-th scan lines that are arranged in the second region, n data lines intersecting with the scan lines which are arranged in the first region, n data lines intersecting with the scan lines which are arranged in the second region, pixels that are installed to correspond to intersection of the scan lines and the data lines respectively, in each of the first region and the second region, a first scan line drive circuit that drives from the first to the m-th scan lines, a second scan line drive circuit that drives from the m+1-th to the 2m-th scan lines, a first data line drive circuit that drives the data line intersecting with the first to the m-th scan lines, and a second data line drive circuit that drives the data line intersecting with the m+1-th to the 2m-th scan lines, the method including supplying an active scan signal to each scan line while skipping a portion of a plurality of the scan lines, per one horizontal scan period, in a direction of the first to the m-th scan lines, or in a direction of the m-th to the first scan lines, by the first scan line drive circuit, supplying the active scan signal to each scan line while skipping the portion of the plurality of the scan lines, per one horizontal scan period, in a direction of the 2m-th to the m+1-th scan lines which is a direction opposite to the supply direction of the scan signal to the scan line by the first scan line drive circuit, or in a direction of the m+1-th to the 2m-th scan lines, by the second scan line drive circuit, and synchronizing with a timing of supplying the active signal by the first scan line drive circuit and the second scan line drive circuit, and supplying a data signal whose polarity is inverted to a positive polarity potential and a negative polarity potential per one horizontal scan period, to the data line, by the first data line drive circuit and the second data line drive circuit.

Next, an electronic apparatus according to still another aspect of the invention, includes the liquid crystal display device according to the aspect of the invention described above. Since the electronic apparatus described above can shorten the time which is necessary for rewriting of one screen in the display device such as a liquid crystal display, it is possible to correspond to a case of shortening a writing time of a data voltage per one pixel, by making more high resolution or the like. Moreover, it is possible to improve image quality, without emphasizing the boundary unit of the screen which is divided into two, and without the upper and lower luminance difference.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Configuration of Liquid Crystal Display Device

Figure 1:
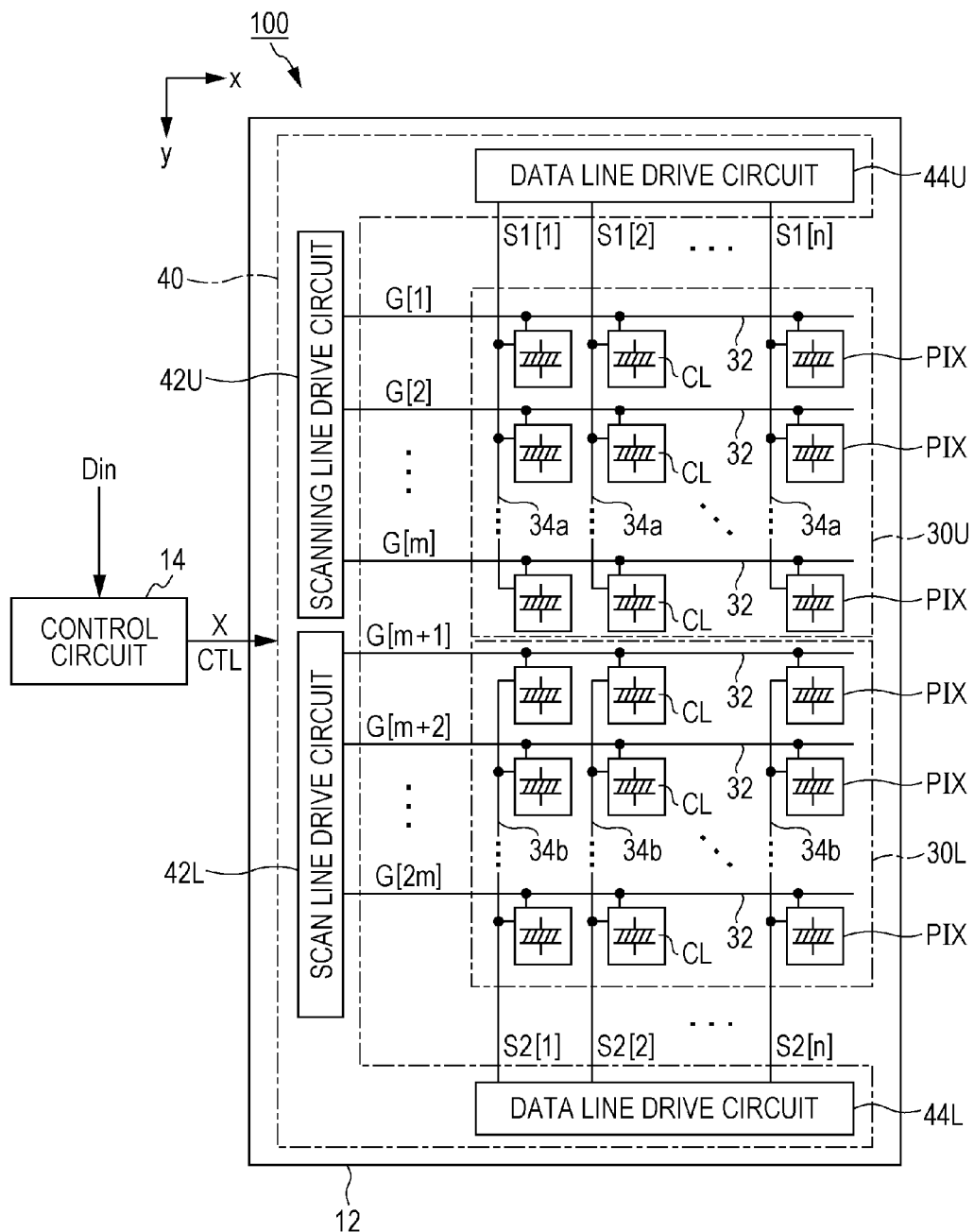
FIG. 1 is a block diagram illustrating a configuration of a liquid crystal display device according to a first embodiment of the invention.

FIG. 1 is a block diagram of a liquid crystal display device 100 according to a first embodiment of the invention. The liquid crystal display device 100 has an electro-optical panel 12, and a control circuit 14. The electro-optical panel 12 is divided into two screens above and below, and includes an upper side pixel area 30U, and a lower side pixel area 30L. Furthermore, the electro-optical panel 12 includes a drive circuit 40. In the upper side pixel area 30U and the lower side pixel area 30L, a plurality of pixels (pixel circuit) PIX are arranged. In the drive circuit 40, an upper side data line drive circuit 44U that drives each pixel PIX of the upper side pixel area 30U, an upper side scan line drive circuit 42U, a lower side data line drive circuit 44L that drive each pixel PIX of the lower side pixel area 30L, and a lower side scan line drive circuit 42L, are included.

In the upper side pixel area 30U, m scan lines 32 extending in a y direction which are from the first to the m-th, and n data lines 34a extending in an x direction which intersects with the y direction, are formed (m and n are natural numbers). Furthermore, in the lower side pixel area 30L, m scan lines 32 extending in the y direction which are from the m+1-th to the 2m-th, and n data lines 34b extending in the x direction which intersects with the y direction, are formed (m and n are the natural numbers). Moreover, the first to the m-th scan lines 32 are driven by the upper side scan line drive circuit 42U, and the m+1-th to the 2m-th scan lines 32 are driven by the lower side scan line drive circuit 42L, independently from the first to the m-th scan lines 32.

The plurality of the pixels PIX within the upper side pixel area 30U, are arranged in a matrix shape of vertical m rows× horizontal n columns corresponding to each intersection of the scan line 32 and the data line 34a. Moreover, the plurality of the pixels PIX within the lower side pixel area 30L, are arranged in a matrix shape of vertical m rows×horizontal n columns corresponding to each intersection of the scan line 32 and the data line 34b.

Figure 2:
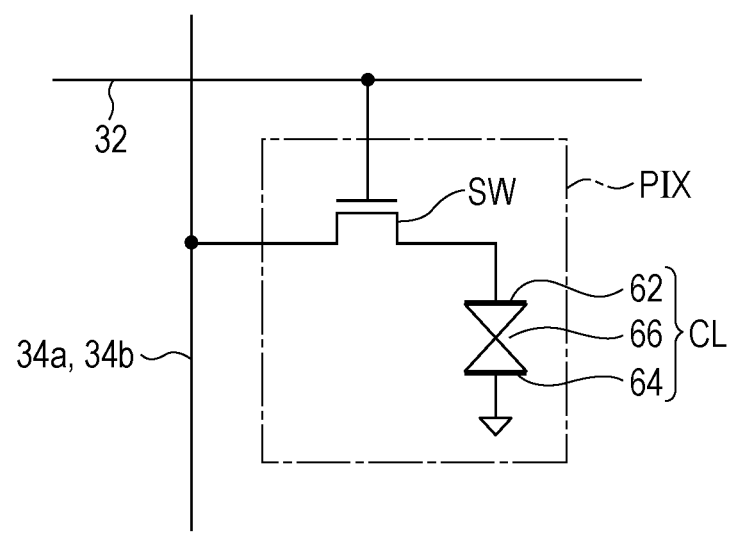
FIG. 2 is a circuit diagram illustrating a configuration of a pixel.

FIG. 2 is a circuit diagram of each pixel PIX. As shown in FIG. 2, each pixel PIX includes a liquid crystal element CL, and a switching element SW. The liquid crystal element CL is an electro-optical element which is configured of a pixel electrode 62 and a common electrode 64 facing each other, and a liquid crystal 66 between the two electrodes. According to an applied voltage between the pixel electrode 62 and the common electrode 64, transmittance (display gradation) of the liquid crystal 66 varies. The switching element SW is configured of a thin film transistor of an N channel type where a gate is connected to the scan line 32. The switching element SW is interposed between the liquid crystal element CL and the data lines 34a and 34b, and controls an electrical connection (conduction/insulation) of the two. Furthermore, a configuration where an auxiliary capacity is connected to the liquid crystal element CL in parallel, can be also employed.

The control circuit 14 controls the whole liquid crystal display device 100, generates an image signal X on the basis of an input image data Din, and supplies the image signal X to the drive circuit 40. Moreover, the control circuit 14 supplies control signals CTL of various kinds with respect to the drive circuit 40.

In the embodiment, in order to prevent a so-called ghosting, a polarity inversion drive which inverts polarity of a voltage applied to the liquid crystal element CL on a predetermined cycle, is employed. In the embodiment, a level of image signals S1 and S2 which are supplied to the pixel PIX through the data lines 34a and 34b, is inverted per one horizontal scan period using a reference voltage as a center, and is further inverted per a unit period. In this example, the unit period is one vertical scan period. However, the unit period can be arbitrarily set, for example, may be natural number of several times of the vertical scan period.

Among the drive circuit 40, the upper side data line drive circuit 44U supplies image signals S1[1] to S1[n] which control the display gradation of each pixel PIX in the upper side pixel area 30U, to each pixel PIX. Moreover, the lower side data line drive circuit 44L supplies image signals S2[1] to S2[n] which control the display gradation of each pixel PIX in the lower side pixel area 30L, to each pixel PIX. Among the drive circuit 40, the upper side scan line drive circuit 42U selects each scan line 32 in order described later, with the supply of scan signals G[1] to G[m] corresponding to each scan line 32 in the upper side pixel area 30U. A scan signal G[M] (M=1 to m) is set at a predetermined selection potential (that is, the scan line 32 of the M-th row is selected), and thereby, the switching element SW in each pixel PIX of the M-th row is transited to an on state at the same time. Furthermore, among the drive circuit 40, the lower side scan line drive circuit 42L selects each scan line 32 in order described later, with the supply of scan signals G[m+1] to G[2m] corresponding to each scan line 32 in the lower side pixel area 30L. A scan signal G[N] (N=m+1 to 2m) is set at the predetermined selection potential (that is, the scan line 32 of the N-th row is selected), and thereby, the switching element SW in each pixel PIX of the N-th row is transited to the on state at the same time.

The upper side data line drive circuit 44U supplies the image signals S1[1] to S1[n] to each of the n data lines 34a in synchronization with the selection of the scan line 32 by the upper side scan line drive circuit 42U. The potential of the image signals S1[1] to S1[n] which are supplied to the data line 34a at the time of selecting the scan line 32 (when the switching element SW is controlled to the on state), is held in the liquid crystal element CL, and each pixel PIX (liquid crystal element CL) displays the gradation according to the potential thereof. The lower side data line drive circuit 44L supplies the image signals S2[1] to S2[n] to each of the n data lines 34b in synchronization with the selection of the scan line 32 by the lower side scan line drive circuit 42L. The potential of the image signals S2[1] to S2[n] which are supplied to the data line 34b at the time of selecting the scan line 32 (when the switching element SW is controlled to the on state), is held in the liquid crystal element CL, and each pixel PIX (liquid crystal element CL) displays the gradation according to the potential thereof.

Drive System of Scan Line

Figure 3:
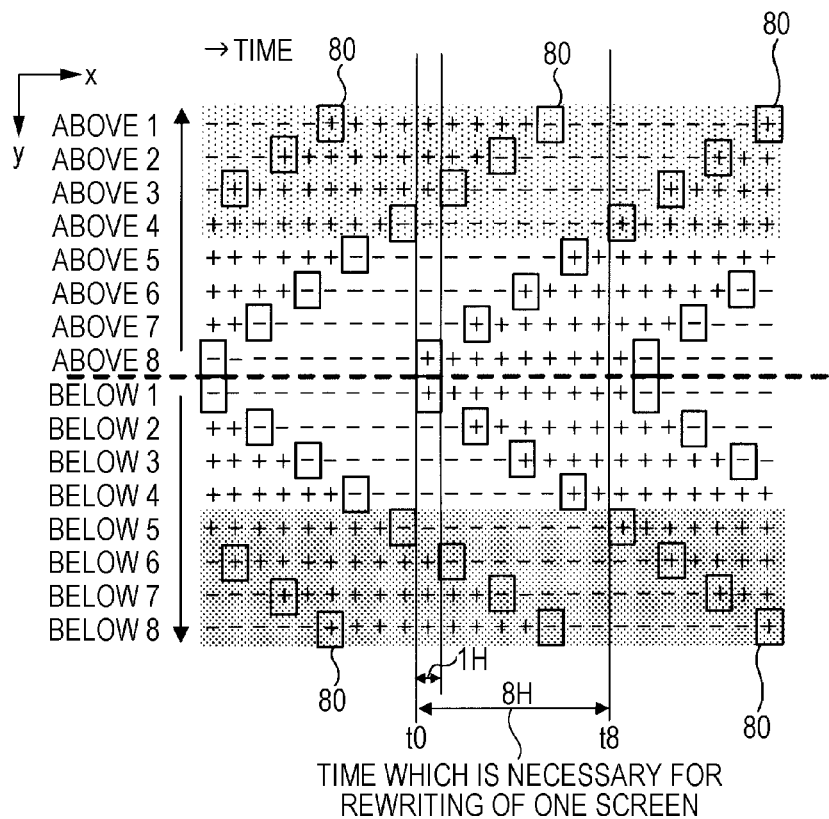
FIG. 3 is a diagram illustrating a state of a variation in polarity on a screen following a flow of time.

Next, a drive system of the scan line in the liquid crystal display device 100 of the embodiment, will be described in detail. FIG. 3 is a diagram illustrating a state of a variation in polarity on a screen following a flow of time. In FIG. 3, an axis of the x direction indicates the time, and the axis of the y direction indicates a position of the scan line 32. In FIG. 3, in order to simplify the description, an example in which the scan lines 32 in the upper side pixel area 30U are eight of above1 to above8, and the scan lines 32 in the lower side pixel area 30L are eight of below1 to below8, is described.

In FIG. 3, rectangular frames 80 which are plurally displayed, indicates the position of the scan line 32 selected in one horizontal scan period (1H). That is, a width of the x direction of the rectangular frame 80, corresponds to one horizontal scan period (1H). The polarity which is indicated within the rectangular frame 80, indicates the polarity of a data signal supplied to the data line. For example, one horizontal scan period (1H) which starts from a timing t0 in FIG. 3, indicates that the scan line 32 of above8, that is, the 8-th scan line 32 in the upper side pixel area 30U is selected, and the scan line 32 of below1, that is, the first scan line 32 in the lower side pixel area 30L is selected. Moreover, when the scan line 32 of above8 and the scan line 32 of below1 are selected, it is indicated that the polarity of the data signal which is supplied to the data line 34a and the data line 34b, is positive (+).

Figure 5:
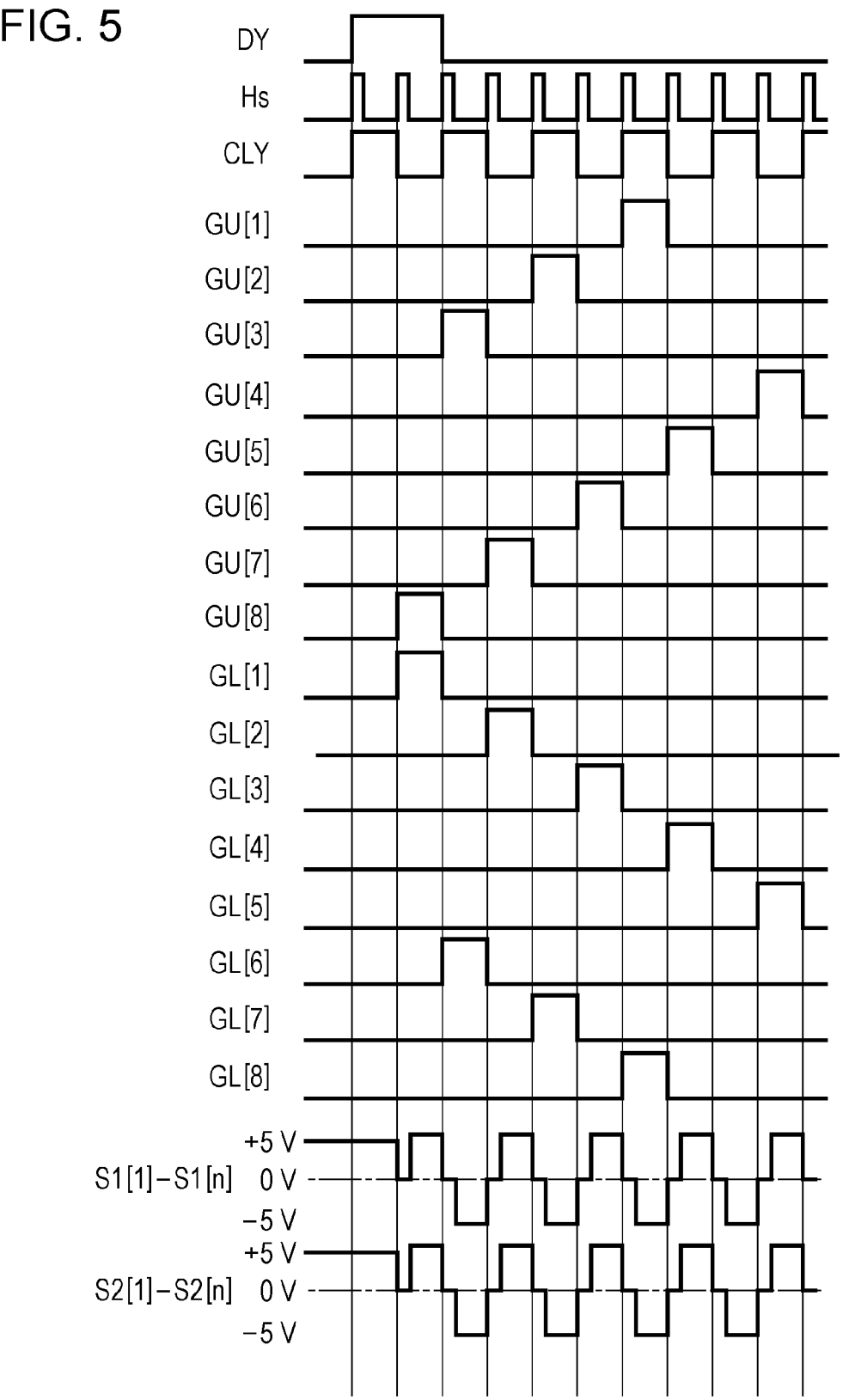
FIG. 5 is a timing chart illustrating a selection timing of a scan signal, a supply timing of a data signal, and the polarity.

FIG. 5 is a timing chart illustrating a selection timing of the scan signal, a supply timing of the data signal, and the polarity of the embodiment. In FIG. 5, the scan signals which are supplied to the scan lines 32 of above1 to above8, are indicated by GU[1] to GU[8]. Furthermore, the scan signals which are supplied to the scan lines 32 of below1 to below8, are indicated by GL[1] to GL[8]. In FIG. 5, the data signals which are supplied to the data line 34a intersecting with the scan lines 32 of above1 to above8, are indicated by S1[1] to S1[$n$]. Moreover, the data signals which are supplied to the data line 34b intersecting with the scan lines 32 of below1 to below8, are indicated by S2[1] to S2[$n$]. The polarity of the data signals S1[1] to S1[$n$] and the data signals S2[1] to S2[$n$], is switched between a positive polarity having a voltage value of 0V to +5V, and a negative polarity having the voltage value of −5V to 0V, per one horizontal scan period.

As shown in FIG. 5, the upper side scan line drive circuit 42U generates a Y clock signal CLY in synchronization with a horizontal synchronization signal Hs which is output from the control circuit 14. Therefore, the upper side scan line drive circuit 42U synchronizes with a Y transfer start pulse DY of one frame (1F) cycle which is output from the control circuit 14, and selects the scan line 32 of the upper side in the upper side pixel area 30U per one horizontal scan period. In the embodiment, the scan line 32 of the upper side is selected toward a direction which is from the scan line 32 of above8 closest to a boundary unit of the upper side pixel area 30U and the lower side pixel area 30L, to the scan line 32 of above1 farthest from the boundary unit. However, instead of selecting the scan line 32 in layout order thereof, as above8, above3, above1, above2, above6, above1, and above5, the upper scan line as five scan lines, and the lower scan line as four scan lines are alternately selected, per one horizontal scan period.

As shown in FIG. 5, the lower side scan line drive circuit 42L generates the Y clock signal CLY in synchronization with the horizontal synchronization signal Hs which is output from the control circuit 14. Therefore, the lower side scan line drive circuit 42L synchronizes with the Y transfer start pulse DY of one frame (1F) cycle which is output from the control circuit 14, and selects the scan line 32 of the lower side in the lower side pixel area 30L per one horizontal scan period. In the embodiment, on the contrary to the scan line 32 of the upper side, the scan line 32 of the lower side is selected toward the direction which is from the scan line 32 of below1 closest to the boundary unit of the upper side pixel area 30U and the lower side pixel area 30L, to the scan line 32 of below8 farthest from the boundary unit. However, instead of selecting the scan line 32 in layout order thereof, as below1, below6, below2, below7, below3, below8, and below4, the lower scan line as five scan lines, and the upper scan line as four scan lines are alternately selected, per one horizontal scan period.

As described above, in the embodiment, toward the direction which is from the scan line close to the boundary unit in the upper side pixel area 30U, to the scan line far from the boundary unit, that is, toward an upper direction, the scan line is selected, and toward the direction which is from the scan line close to the boundary unit in the lower side pixel area 30L, to the scan line far from the boundary unit, that is, toward an lower direction, the scan line is selected. The order of the selection is such that the upper scan line as five scan lines, and the lower scan line as four scan lines are alternately selected, in the upper side pixel area 30U, and the lower scan line as five scan lines, and the upper scan line as four scan lines are alternately selected, in the lower side pixel area 30L, per one horizontal scan period. Moreover, the polarity of the data signal which is supplied to the data lines 34a and 34b intersecting with each scan line, is alternately switched between the positive polarity and the negative polarity, per one horizontal scan period. That is, in the embodiment, on the screen which is divided into two, the scan referred to as a so-called region scan, is performed.

As the embodiment, by separately performing the scan in the upper side pixel area 30U and the lower side pixel area 30L, a time which is necessary for rewriting of one screen, is finished at 8H which is eight times of one horizontal scan period (1H). In contrast, as a comparative example shown in FIG. 15, in the case of selecting the scan line 32 of above1 to the scan line 32 of below8 in order, as the time which is necessary for the input data as one field to rewrite on the whole screen, 16H which is 16 times of one horizontal scan period (1H), is necessary. Consequently, in the embodiment, it is possible to rewrite one screen at double speed in comparison with the comparative example shown in FIG. 15, and a shutter open time of 3D glasses at the time of driving an active system 3D (three-dimensional display), or, a lighting time of an RGB light source at the time of driving a field sequential, can be secured long.

Figure 15:
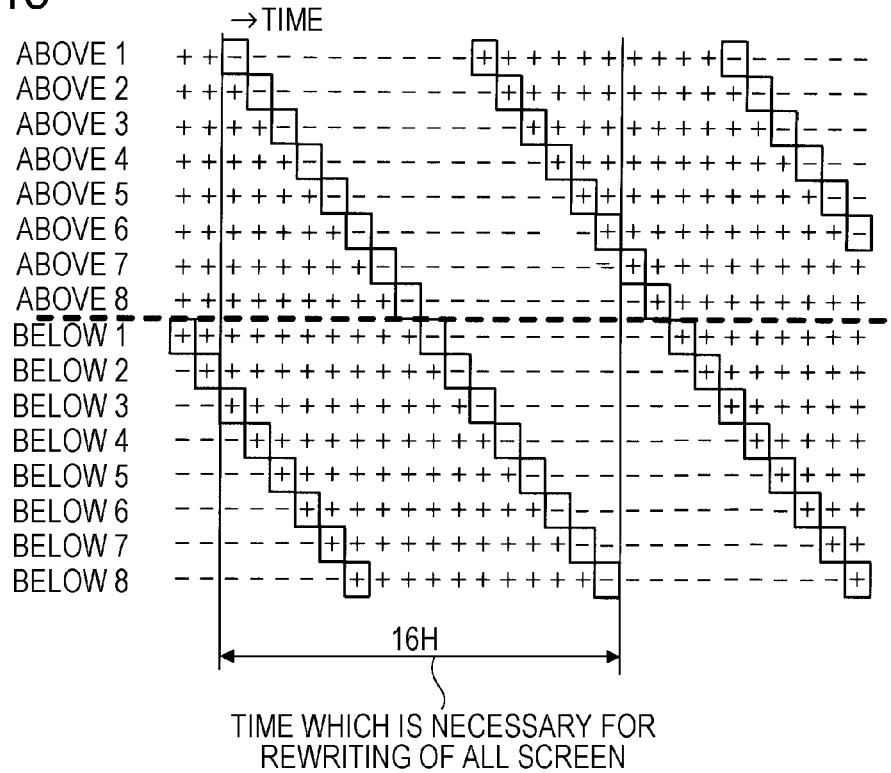
FIG. 15 is a diagram illustrating a state of a variation in polarity on a screen following a flow of time in a comparative example.
Figure 17:
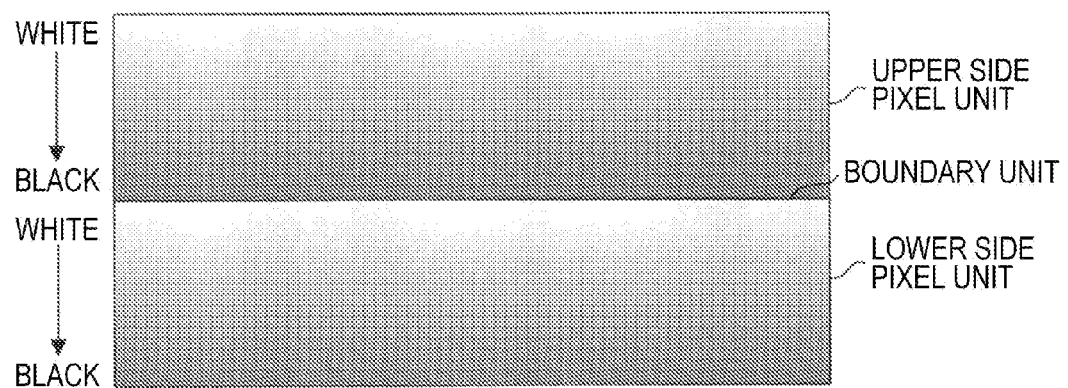
FIG. 17 is a diagram describing an occurrence state of an upper and lower luminance unevenness.

Furthermore, as a comparative example shown in FIG. 15, in the case of scanning from the scan line 32 of below1 to the scan line 32 of below8 in the lower side pixel area after scanning from the scan line 32 of above1 to the scan line 32 of above8 in the upper side pixel area, an upper and lower luminance unevenness occurs in each of the upper side pixel area and the lower side pixel area, as shown in FIG. 17. In the case of driving the comparative example, for a reverse twist domain avoidance by a horizontal electric field between adjacent pixels described later, only the polarity inversion of the unit period described above is performed. Since the time which is from a polarity inversion timing up to writing the voltage according to the polarity inversion, is taken as the pixel corresponding to the scan line of the lower side, a voltage polarity which is held in the pixel written in a previous time, and the voltage polarity which is applied to the data line, are different, and thereby, the period in which a potential different of both ends the switching element of the pixel becomes large, becomes long, and a leakage current is increased. For example, in the case of the liquid crystal of normally black, as shown in FIG. 17, in each of the upper side pixel area and the lower side pixel area, reduction in luminance is larger in the lower side region than the upper side region, and it becomes a dark color. Consequently, in the boundary unit, the lower side region of the upper side pixel area becomes the dark color, and the upper side region the lower side pixel area becomes a light color, and thus, the luminance difference in the boundary unit is emphasized.

However, in the embodiment, in the upper side pixel area 30U, the scan is performed in the direction which is from the scan line close to the boundary unit toward the scan line far from the boundary unit, and even in the lower side pixel area 30L, the scan is performed in the direction which is from the scan line close to the boundary unit, toward the scan line far from the boundary unit. Since the scan direction in the upper side pixel area 30U is the direction which is opposite to the scan direction in the lower side pixel area 30L, it is possible to suppress the luminance difference in the boundary unit of the upper side pixel area 30U and the lower side pixel area 30L.

Figure 18:
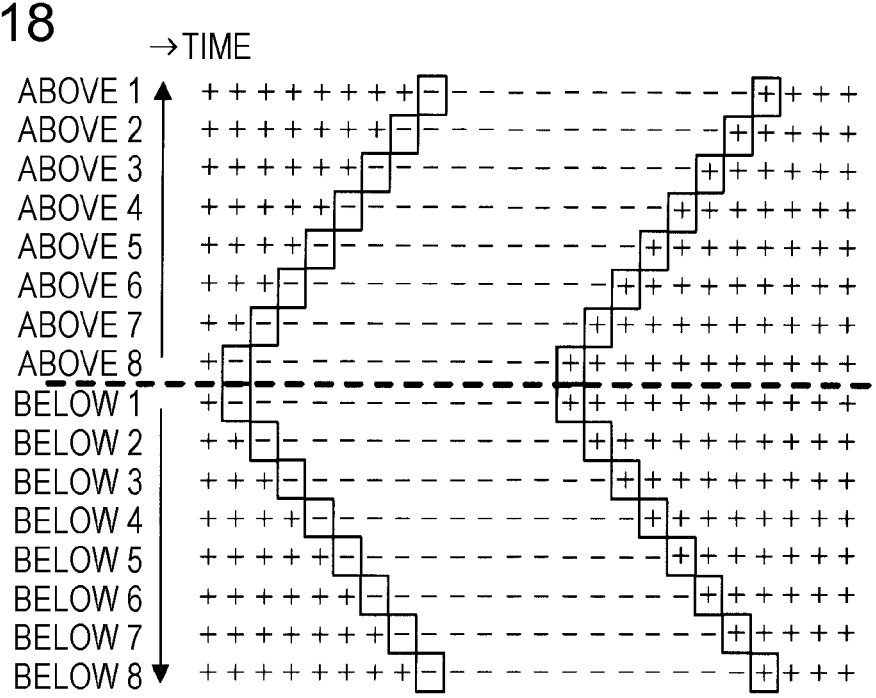
FIG. 18 is a diagram illustrating a state of a variation in polarity on a screen following a flow of time in a comparative example.

Even when the scan direction in the upper side pixel area 30U is the direction which is opposite to the scan direction in the lower side pixel area 30L, as shown in FIG. 18, in the case where the selection order of the scan line is the layout order of the scan line, in each of the upper side pixel area and the lower side pixel area, the period in which the data line has the same polarity, becomes long. In contrast, in the case of the embodiment, since the region scan described above is performed in each of the upper side pixel area and the lower side pixel area, the period in which the data line has the same polarity, becomes short, and the switching of the polarity can be averagely performed in each of the upper side pixel area and the lower side pixel area. As a result, in each of the upper side pixel area and the lower side pixel area, it is possible to make a leakage current amount of the switching element of the pixel uniform on the whole, and it is possible to suppress an upper and lower luminance difference itself.

In the case of the liquid crystal display panel as in the embodiment, if the potentials of the adjacent pixel electrodes are different, the horizontal electric field is formed between the pixel electrodes, and if a distance between the pixels becomes narrow, an effect which the horizontal electric field has on an orientation of a liquid crystal layer, becomes large, and a defect on the display is generated. Specifically, when an orientation regulation direction of a horizontal oriented film which is formed to cover the horizontal electric field formed between the pixel electrodes and the pixel electrode is parallel, by the horizontal electric field, the reverse twist domain where liquid crystal molecules are twisted in the direction opposite to an original twist direction, occurs on the pixel electrode, disorder is generated in an arrangement of the liquid crystal molecules on the single pixel electrode, and disclination occurs in the pixel area of a white display.

Figure 4:
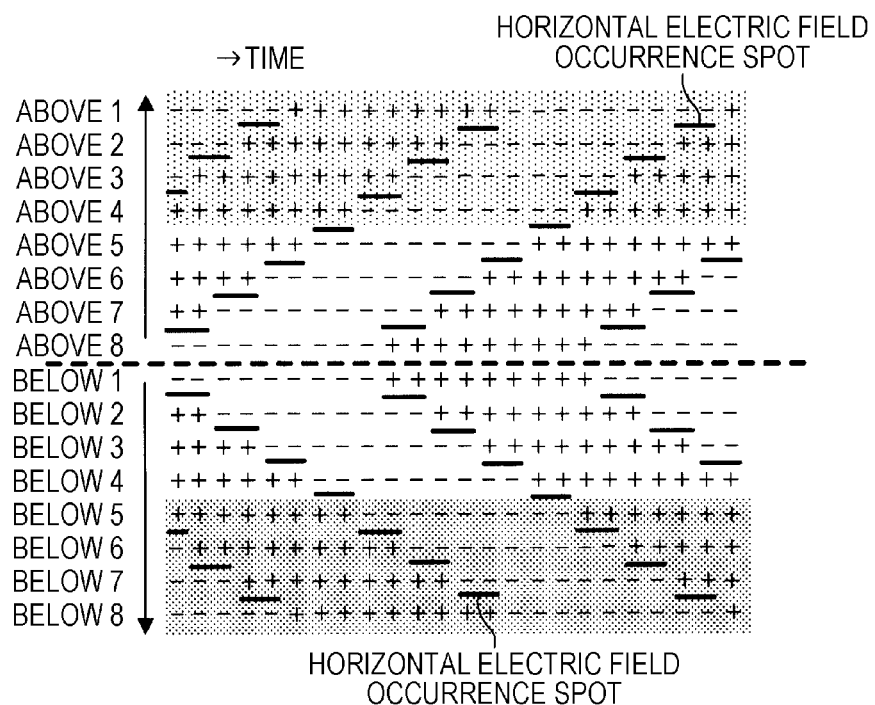
FIG. 4 is a diagram illustrating an occurrence spot of a horizontal electric field.

In FIG. 4, spots indicated by a plurality of thick lines, indicate occurrence spots of the horizontal electric field. As shown in FIG. 4, in the case of the embodiment, since the horizontal electric field occurs only in the same period between the all scan lines, an occurrence amount of the reverse twist domain is made almost uniform in the whole screen. However, since the horizontal electric field does not occur in the boundary unit of the upper side pixel area 30U and the lower side pixel area 30L, the difference between other portions is generated.

Figure 16:
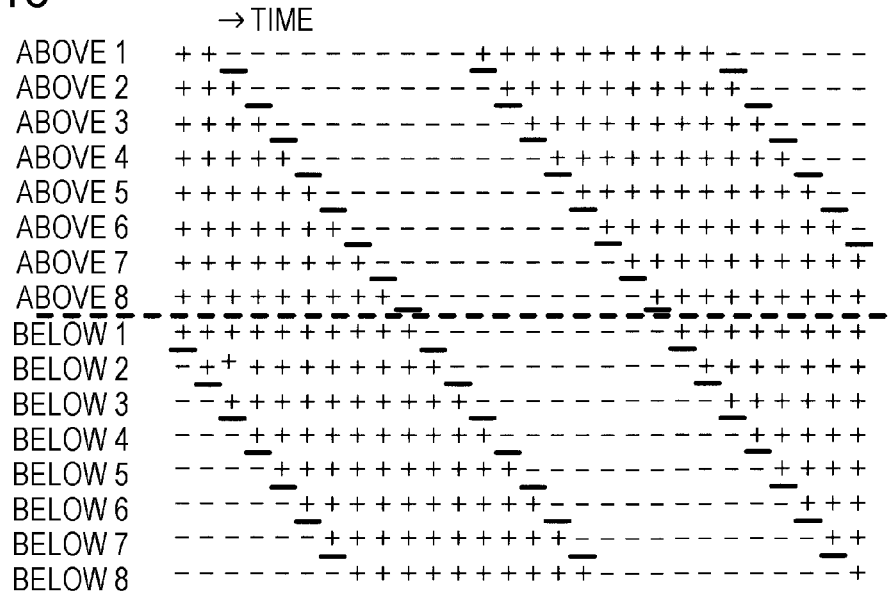
FIG. 16 is a diagram illustrating the occurrence spot of the horizontal electric field.
Figure 19:
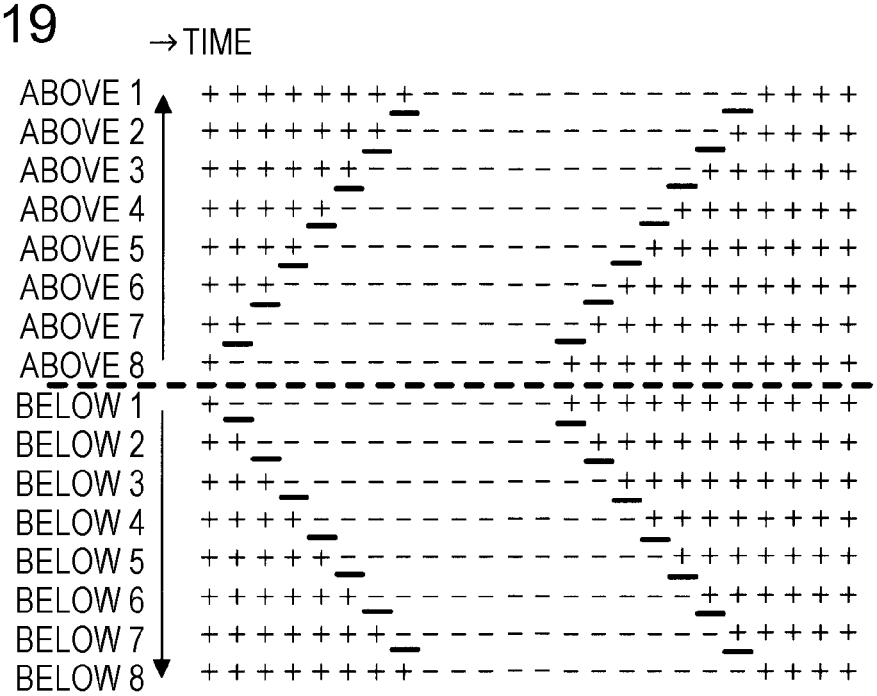
FIG. 19 is a diagram illustrating the occurrence spot of the horizontal electric field.

FIG. 19 indicates the occurrence spot of the horizontal electric field in the comparative example of FIG. 18. As shown in FIG. 19, in the case of the comparative example, since the horizontal electric field occurs only in the same period between the all scan lines, the occurrence amount of the reverse twist domain is made almost uniform in the whole screen. In the case of the comparative example, since the horizontal electric field does not occur in the boundary unit of the upper side pixel area and the lower side pixel area, the difference between other portions is generated. On the other hand, FIG. 16 indicates the occurrence spot of the horizontal electric field in the comparative example shown in FIG. 15. As shown in FIG. 16, in the case of the comparative example, since not only the horizontal electric field occurs only in the same period between the all scan lines, but also the horizontal electric field occurs in the boundary unit of the upper side pixel area and the lower side pixel area, the occurrence amount of the reverse twist domain is made uniform in the whole screen, and the boundary unit is not emphasized.

Second Embodiment

Next, a second embodiment of the invention will be described with reference to FIG. 6 to FIG. 8. The liquid crystal display device 100 of the embodiment, is configured in almost the same manner as the liquid crystal display device 100 of the first embodiment, but the scan direction in the upper side pixel area 30U and the lower side pixel area 30L is different from that of the first embodiment.

Figure 6:
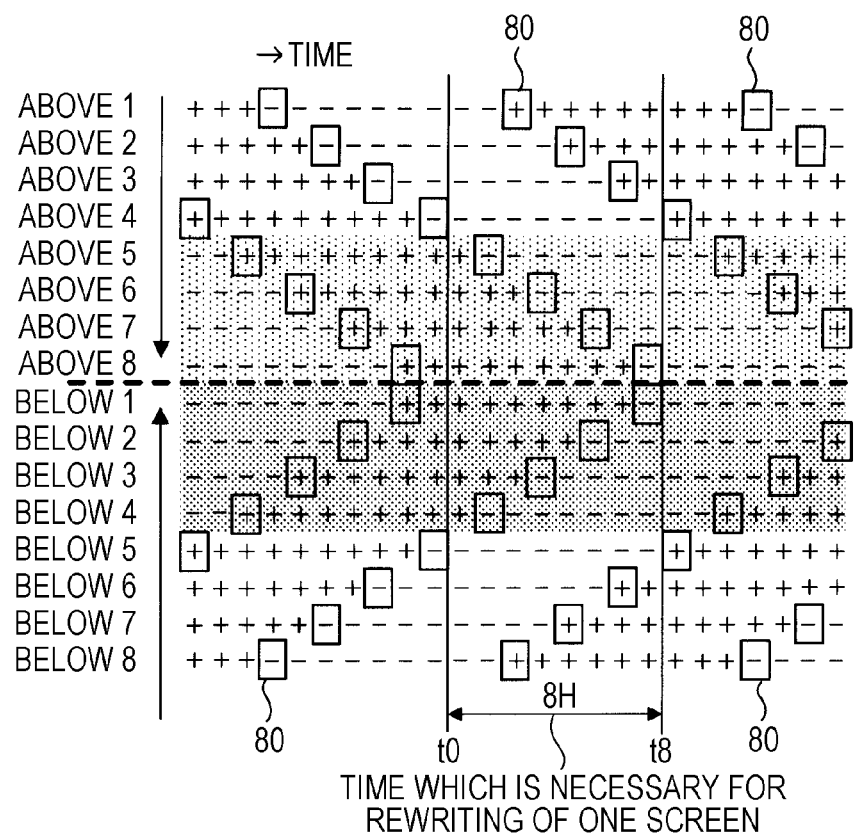
FIG. 6 is a diagram illustrating a state of a variation in polarity on a screen following a flow of time in a second embodiment of the invention.

FIG. 6 is a diagram illustrating a state of a variation in polarity on a screen following a flow of time in the embodiment. FIG. 8 is a timing chart illustrating the selection timing of the scan signal, the supply timing of the data signal, and the polarity of the embodiment. As shown in FIG. 6 and FIG. 8, in the embodiment, in the upper side pixel area 30U, eight horizontal scan periods (8H) which start from the timing t0 in FIG. 6, select the scan line 32, toward the direction which is from the scan line 32 of above5 far from the boundary unit of the upper side pixel area 30U and the lower side pixel area 30L, to the scan line 32 of above8 closest to the boundary unit. However, in the embodiment, instead of selecting the scan line 32 in layout order thereof, as above5, above1, above6, above2, above7, above3, and above8, the upper scan line as four scan lines, and the lower scan line as five scan lines are alternately selected, per one horizontal scan period.

Similarly, in the lower side pixel area 30L, on the contrary to the scan line 32 of the upper side pixel area 30U, the scan line 32 is selected toward the direction which is from the scan line 32 of below4 far from the boundary unit of the upper side pixel area 30U and the lower side pixel area 30L, to the scan line 32 of below1 closest to the boundary unit. However, instead of selecting the scan line 32 in layout order thereof, as below4, below8, below3, below7, below2, below6, and below1, the lower scan line as four scan lines, and the upper scan line as five scan lines are alternately selected, per one horizontal scan period.

In the embodiment, the direction which is from the scan line far from the boundary unit in the upper side pixel area 30U, to the scan line close to the boundary unit, that is, toward the lower direction, the scan line is selected, and the direction which is from the scan line far from the boundary unit in the lower side pixel area 30L, to the scan line close to the boundary unit, that is, toward the upper direction, the scan line is selected. The order of the selection is such that the upper scan line as four scan lines, and the lower scan line as five scan lines are alternately selected, in the upper side pixel area 30U, and the lower scan line as four scan lines, and the upper scan line as five scan lines are alternately selected, in the lower side pixel area 30L, per one horizontal scan period. Moreover, the polarity of the data signal which is supplied to the data lines 34a and 34b intersecting with each scan line, is alternately switched between the positive polarity and the negative polarity, per one horizontal scan period. That is, in the embodiment, on the screen which is divided into two, the scan referred to as the so-called region scan, is performed.

In the embodiment, by separately performing the scan in the upper side pixel area 30U and the lower side pixel area 30L, the time which is necessary for rewriting of one screen, is finished at 8H which is eight times of one horizontal scan period (1H), and it is possible to rewrite one screen at double speed in comparison with the comparative example shown in FIG. 15. Consequently, the shutter open time of the 3D glasses at the time of driving the active system 3D (three-dimensional display), or, the lighting time of the RGB light source at the time of driving the field sequential, can be secured long.

Moreover, in the embodiment, in the upper side pixel area 30U, the scan is performed in the direction which is from the scan line far from the boundary unit, toward the scan line close to the boundary unit, and even in the lower side pixel area 30L, the scan is performed in the direction which is from the scan line far from the boundary unit, toward the scan line close to the boundary unit. Since the scan direction in the upper side pixel area 30U is the direction which is opposite to the scan direction in the lower side pixel area 30L, it is possible to suppress the luminance difference in the boundary unit of the upper side pixel area 30U and the lower side pixel area 30L.

In the case of the embodiment, in the same manner as the first embodiment, since the region scan described above is performed in each of the upper side pixel area and the lower side pixel area, the period in which the data line has the same polarity, becomes short, and the switching of the polarity can be averagely performed in each of the upper side pixel area and the lower side pixel area. As a result, in each of the upper side pixel area and the lower side pixel area, it is possible to make the leakage current amount of the switching element of the pixel uniform on the whole, and it is possible to suppress the upper and lower luminance difference itself.

Figure 7:
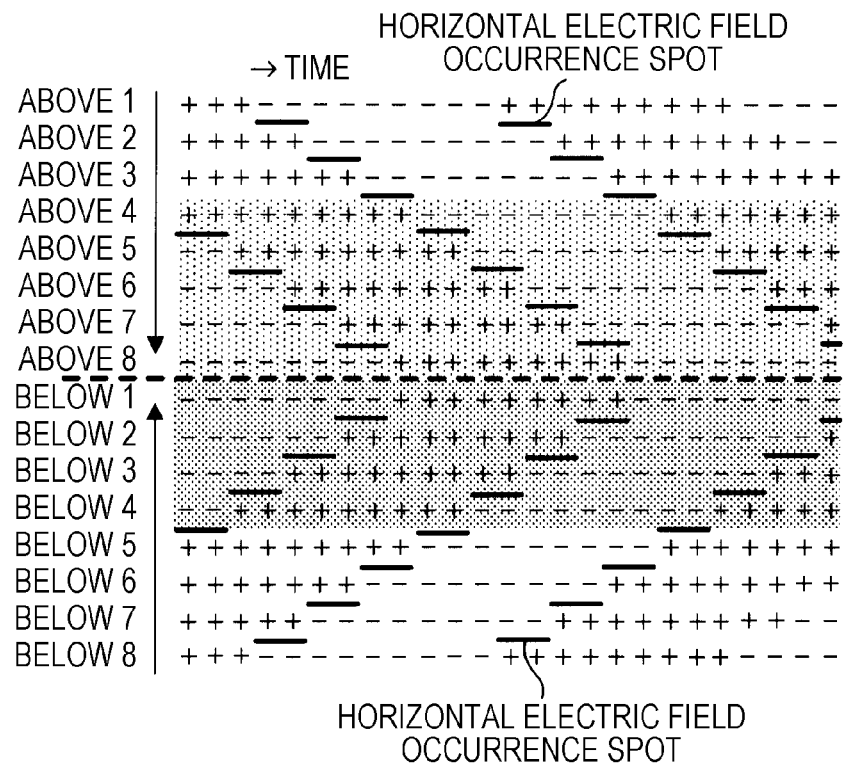
FIG. 7 is a diagram illustrating the occurrence spot of the horizontal electric field.
Figure 8:
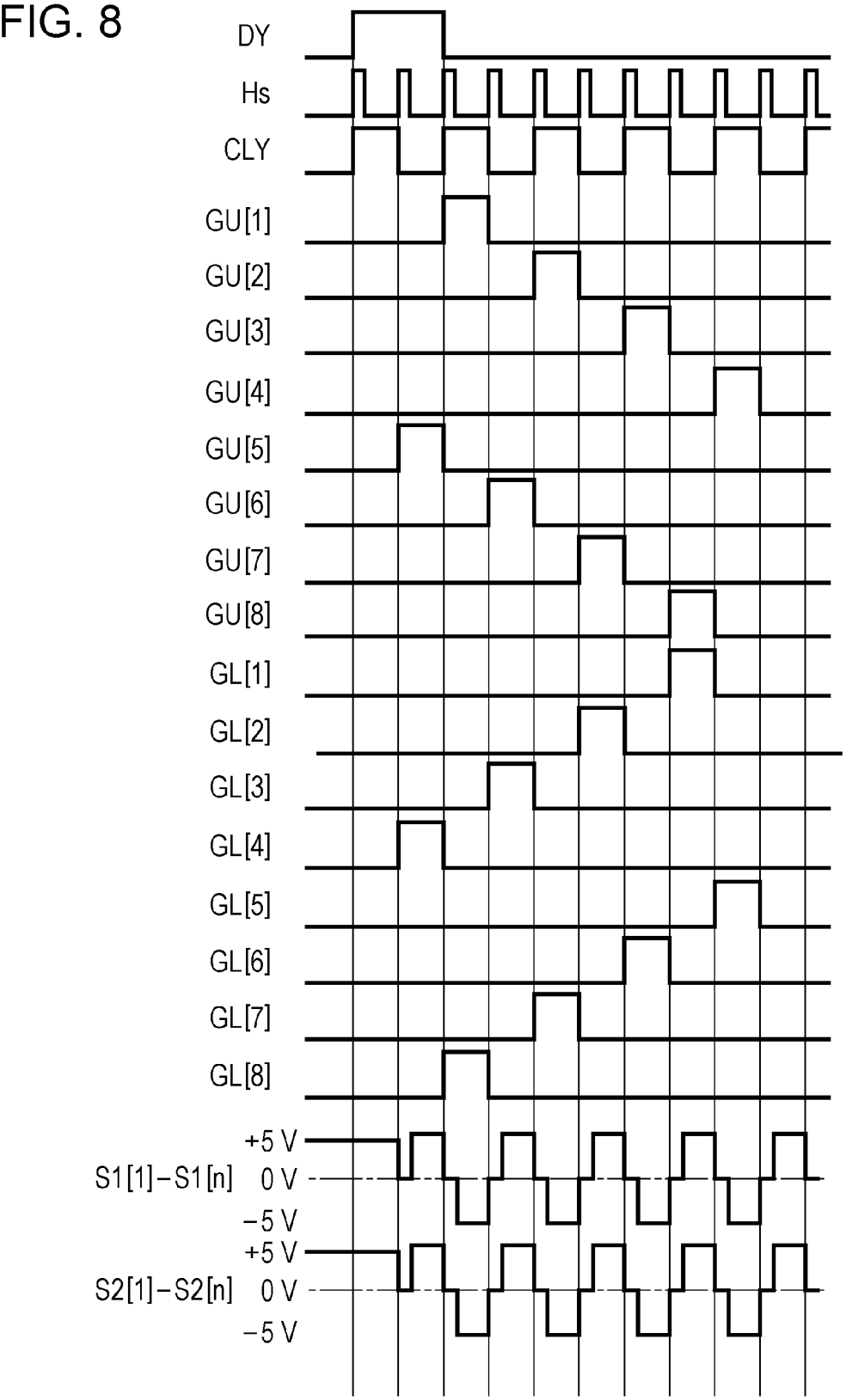
FIG. 8 is a timing chart illustrating the selection timing of the scan signal, the supply timing of the data signal, and the polarity.

In FIG. 7, the spots indicated by the plurality of the thick lines, indicate the occurrence spots of the horizontal electric field in the embodiment. As shown in FIG. 7, in the case of the embodiment, since the horizontal electric field occurs only in the same period between the all scan lines, the occurrence amount of the reverse twist domain can be made almost uniform in the whole screen. However, since the horizontal electric field does not occur in the boundary unit of the upper side pixel area 30U and the lower side pixel area 30L, the difference between other portions is generated.

Third Embodiment

Next, a third embodiment of the invention will be described with reference to FIG. 9 to FIG. 11. The liquid crystal display device 100 of the embodiment, is configured in almost the same manner as the liquid crystal display device 100 of the first embodiment, but a point where a scan start timing in the upper side pixel area 30U, and a scan start timing in the lower side pixel area 30L, are delayed as two horizontal scan periods, is different from that of the first embodiment.

Figure 9:
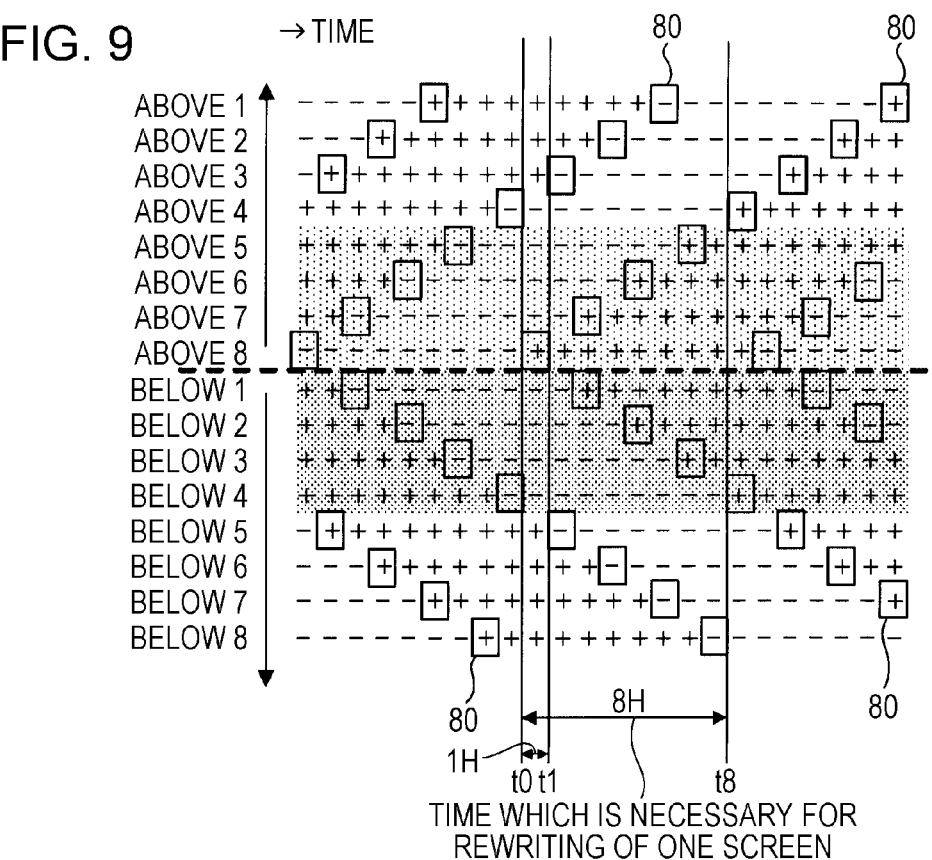
FIG. 9 is a diagram illustrating a state of a variation in polarity on a screen following a flow of time in a third embodiment of the invention.

FIG. 9 is a diagram illustrating a state of a variation in polarity on a screen following a flow of time in the embodiment. FIG. 11 is a timing chart illustrating the selection timing of the scan signal, the supply timing of the data signal, and the polarity of the embodiment. As shown in FIG. 9 and FIG. 11, in the embodiment, in the upper side pixel area 30U, one horizontal scan periods (1H) which starts from the timing t0 in FIG. 9, selects the scan line 32, toward the direction which is from the scan line 32 of above8 closest to the boundary unit of the upper side pixel area 30U and the lower side pixel area 30L, to the scan line 32 of above1 farthest from the boundary unit, in the same manner as the first embodiment. However, in the embodiment, instead of selecting the scan line 32 in layout order thereof, as above8, above3, above1, above2, above6, above1, and above5, the upper scan line as five scan lines, and the lower scan line as four scan lines are alternately selected, per one horizontal scan period.

On the other hand, in the lower side pixel area 30L, instead of starting the scan from the timing t0 shown in FIG. 9, the scan is started from a timing t1 which is shifted as one horizontal scan period (1H) from the timing t0. That is, one horizontal scan period (1H) from the timing t1 selects the scan line 32, toward the direction which is from the scan line 32 of below1 closest to the boundary unit of the upper side pixel area 30U and the lower side pixel area 30L, to the scan line 32 of below8 farthest from the boundary unit. However, instead of selecting the scan line 32 in layout order thereof, as below5, below1, below6, below2, below1, below3, and below8, the upper scan line as four scan lines, and the lower scan line as five scan lines are alternately selected, per one horizontal scan period.

Figure 10:
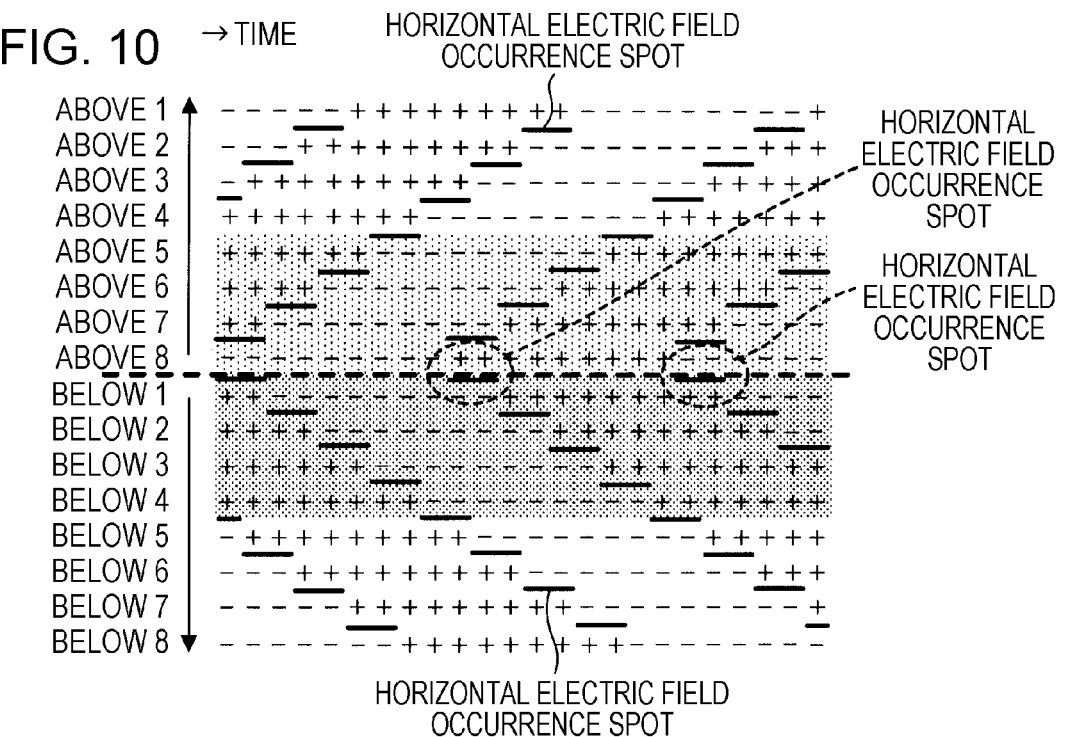
FIG. 10 is a diagram illustrating the occurrence spot of the horizontal electric field.
Figure 11:
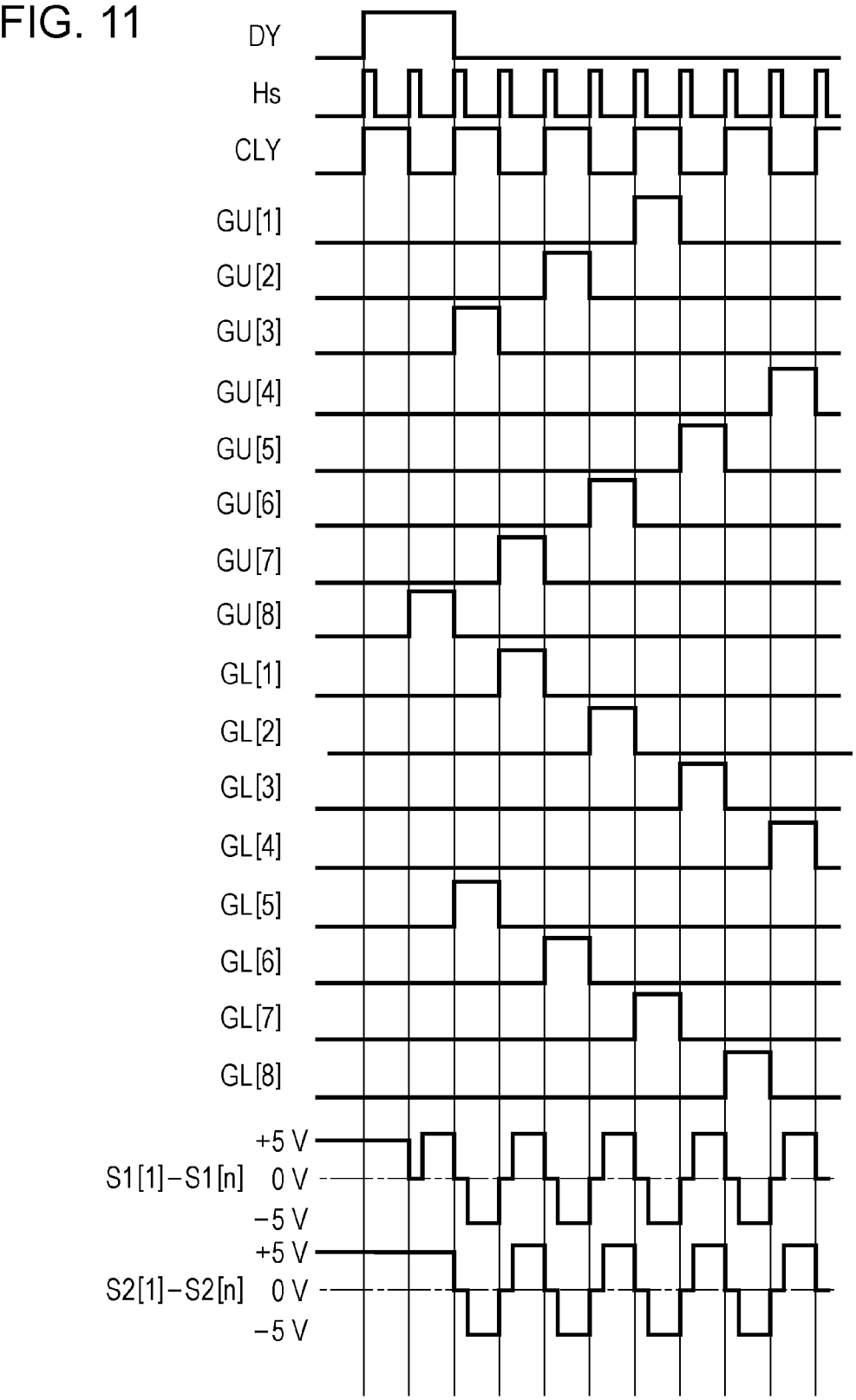
FIG. 11 is a timing chart illustrating the selection timing of the scan signal, the supply timing of the data signal, and the polarity.

In FIG. 10, the spots indicated by the plurality of the thick lines, indicate the occurrence spots of the horizontal electric field in the embodiment. In the case of the embodiment, not only the horizontal electric field occurs only in the same period between the all scan lines, but also the horizontal electric field occurs in the boundary unit of the upper side pixel area 30U and the lower side pixel area 30L, as shown with the spot which is surrounded by an oval of a dotted line in FIG. 10. As a result, since the horizontal electric field occurs not only in the upper side pixel area 30U and the lower side pixel area 30L, but also in the boundary unit of the upper side pixel area 30U and the lower side pixel area 30L, the occurrence amount of the reverse twist domain is made uniform in the whole screen. As a result, the boundary unit of the upper side pixel area 30U and the lower side pixel area 30L, is not emphasized.

Furthermore, in the embodiment, the direction which is from the scan line close to the boundary unit in the upper side pixel area 30U, to the scan line far from the boundary unit, that is, toward the upper direction, the scan line is selected, and the direction which is from the scan line close to the boundary unit in the lower side pixel area 30L, to the scan line far from the boundary unit, that is, toward the lower direction, the scan line is selected. Therefore, the order of the selection is such that the upper scan line as five scan lines, and the lower scan line as four scan lines are alternately selected, in the upper side pixel area 30U, and the lower scan line as five scan lines, and the upper scan line as four scan lines are alternately selected, in the lower side pixel area 30L, per one horizontal scan period. Moreover, the polarity of the data signal which is supplied to the data lines 34a and 34b intersecting with each scan line, is alternately switched between the positive polarity and the negative polarity, per one horizontal scan period. That is, in the embodiment, on the screen which is divided into two, the scan referred to as the so-called region scan, is performed.

In the embodiment, by separately performing the scan in the upper side pixel area 30U and the lower side pixel area 30L, the time which is necessary for rewriting of one screen, is finished at 8H which is eight times of one horizontal scan period (1H), and it is possible to rewrite one screen at double speed in comparison with the comparative example shown in FIG. 15. Consequently, the shutter open time of the 3D glasses at the time of driving the active system 3D (three-dimensional display), or, the lighting time of the RGB light source at the time of driving the field sequential, can be secured long.

Furthermore, in the embodiment, in the upper side pixel area 30U, the scan is performed in the direction which is from the scan line close to the boundary unit, toward the scan line far from the boundary unit, and even in the lower side pixel area 30L, the scan is performed in the direction which is from the scan line close to the boundary unit, toward the scan line far from the boundary unit. Since the scan direction in the upper side pixel area 30U is the direction which is opposite to the scan direction in the lower side pixel area 30L, it is possible to suppress the luminance difference in the boundary unit of the upper side pixel area 30U and the lower side pixel area 30L.

In the case of the embodiment, in the same manner as the first embodiment, since the region scan described above is performed in each of the upper side pixel area and the lower side pixel area, the period in which the pixel corresponding to each scan line holds the same polarity, becomes short, and the switching of the polarity can be averagely performed in each of the upper side pixel area and the lower side pixel area. As a result, in each of the upper side pixel area and the lower side pixel area, it is possible to make the leakage current amount of the switching element of the pixel uniform on the whole, and it is possible to suppress the upper and lower luminance difference itself.

According to the embodiment as described above, in the same manner as the first embodiment, it is possible to shorten the time which is necessary for rewriting of one screen, and not only the upper and lower luminance difference itself can be suppressed by the region scan, but also the reverse twist domain is not nearly conspicuous in the whole screen, since the horizontal electric field occurs not only in the upper side pixel area 30U and the lower side pixel area 30L, but also in the boundary unit of the upper side pixel area 30U and the lower side pixel area 30L, by shifting the scan start timing in the lower side pixel area 30L. As a result, it is possible to prevent the boundary unit of the upper side pixel area 30U and the lower side pixel area 30L from being emphasized.

Fourth Embodiment

Next, a fourth embodiment of the invention will be described with reference to FIG. 12 to FIG. 14. The liquid crystal display device 100 of the embodiment, is configured in almost the same manner as the liquid crystal display device 100 of the third embodiment, but the scan direction in the upper side pixel area 30U and the lower side pixel area 30L, is different from that of the third embodiment.

Figure 12:
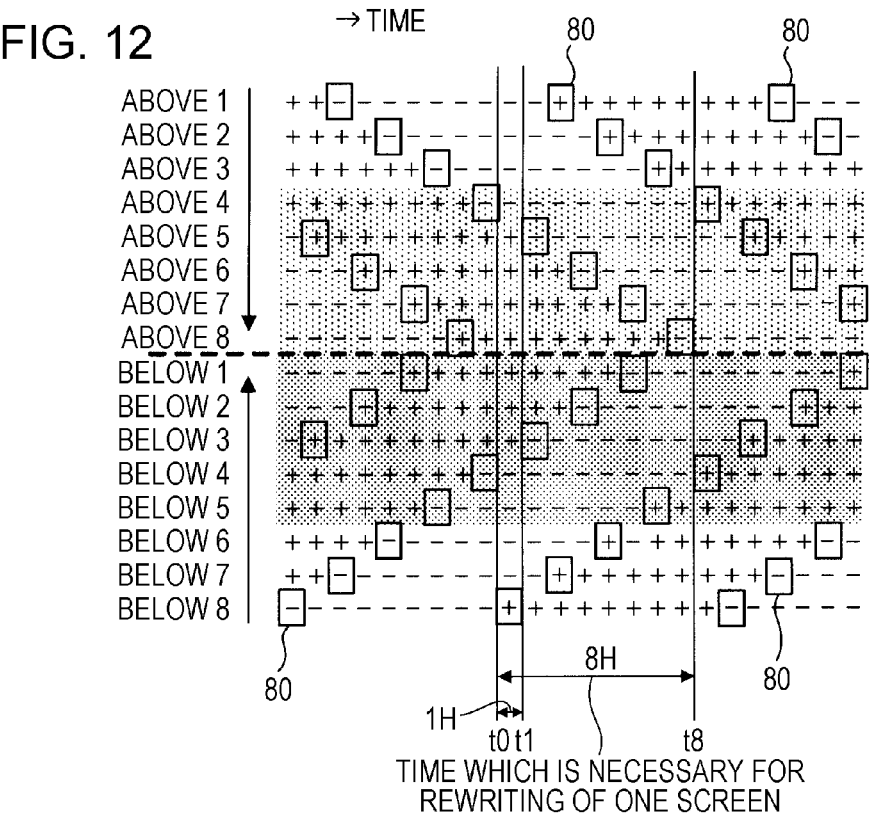
FIG. 12 is a diagram illustrating a state of a variation in polarity on a screen following a flow of time in a fourth embodiment of the invention.

FIG. 12 is a diagram illustrating a state of a variation in polarity on a screen following a flow of time, in the embodiment. FIG. 14 is a timing chart illustrating the selection timing of the scan signal, the supply timing of the data signal, and the polarity of the embodiment. As shown in FIG. 12 and FIG. 14, in the embodiment, eight horizontal scan periods (8H) which start from the timing t0 in FIG. 14, starts the scan from the timing t1 which is shifted as one horizontal scan period (1H) backwards from the timing t0. In the same manner as the second embodiment, in the upper side pixel area 30U, the scan line 32 is selected, toward the direction which is from the scan line 32 of above5 far from the boundary unit of the upper side pixel area 30U and the lower side pixel area 30L, to the scan line 32 of above8 closest to the boundary unit. However, in the embodiment, instead of selecting the scan line 32 in layout order thereof, as above5, above1, above6, above2, above7, above3, and above8, the upper scan line as four scan lines, and the lower scan line as five scan lines are alternately selected, per one horizontal scan period.

On the other hand, in the lower side pixel area 30L, the scan of the scan line 32 of below5 corresponding to the scan line 32 of above5, is started from the timing t0 shown in FIG. 12. That is, from the timing t0, the scan line 32 is selected toward the direction which is from the scan line 32 of below8 farthest from the boundary unit of the upper side pixel area 30U and the lower side pixel area 30L, to the scan line 32 of below1 closest to the boundary unit. However, instead of selecting the scan line 32 in layout order thereof, as below8, below3, below7, below2, below6, below7, below2, below6, below1, and below4, the lower scan line as four scan lines, and the upper scan line as five scan lines are alternately selected, per one horizontal scan period.

Figure 13:
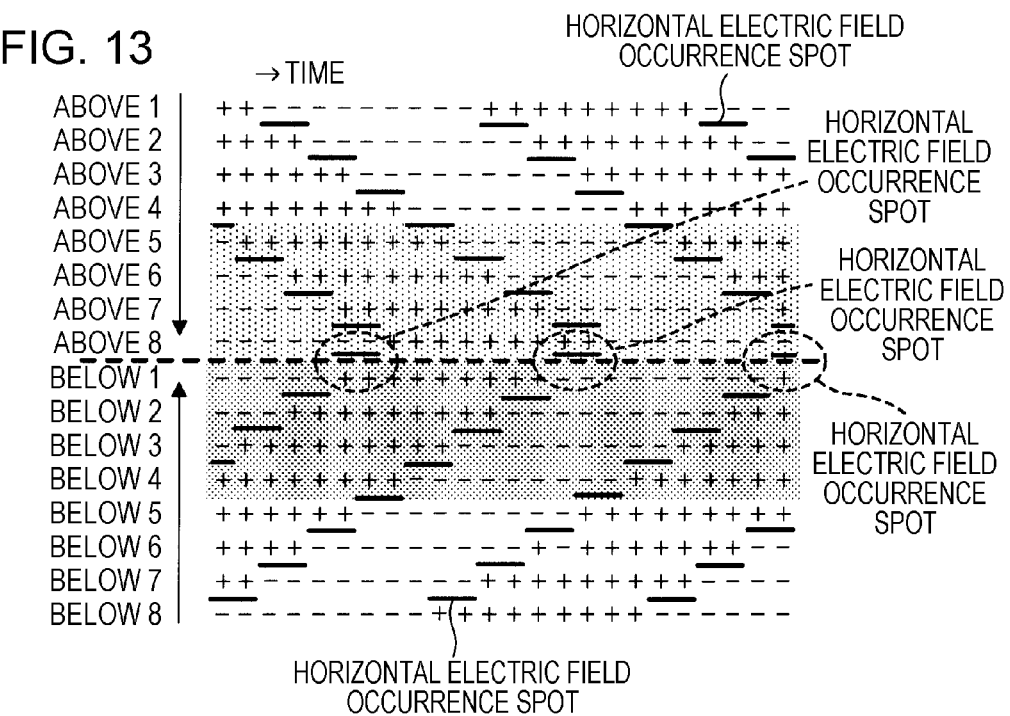
FIG. 13 is a diagram illustrating the occurrence spot of the horizontal electric field.
Figure 14:
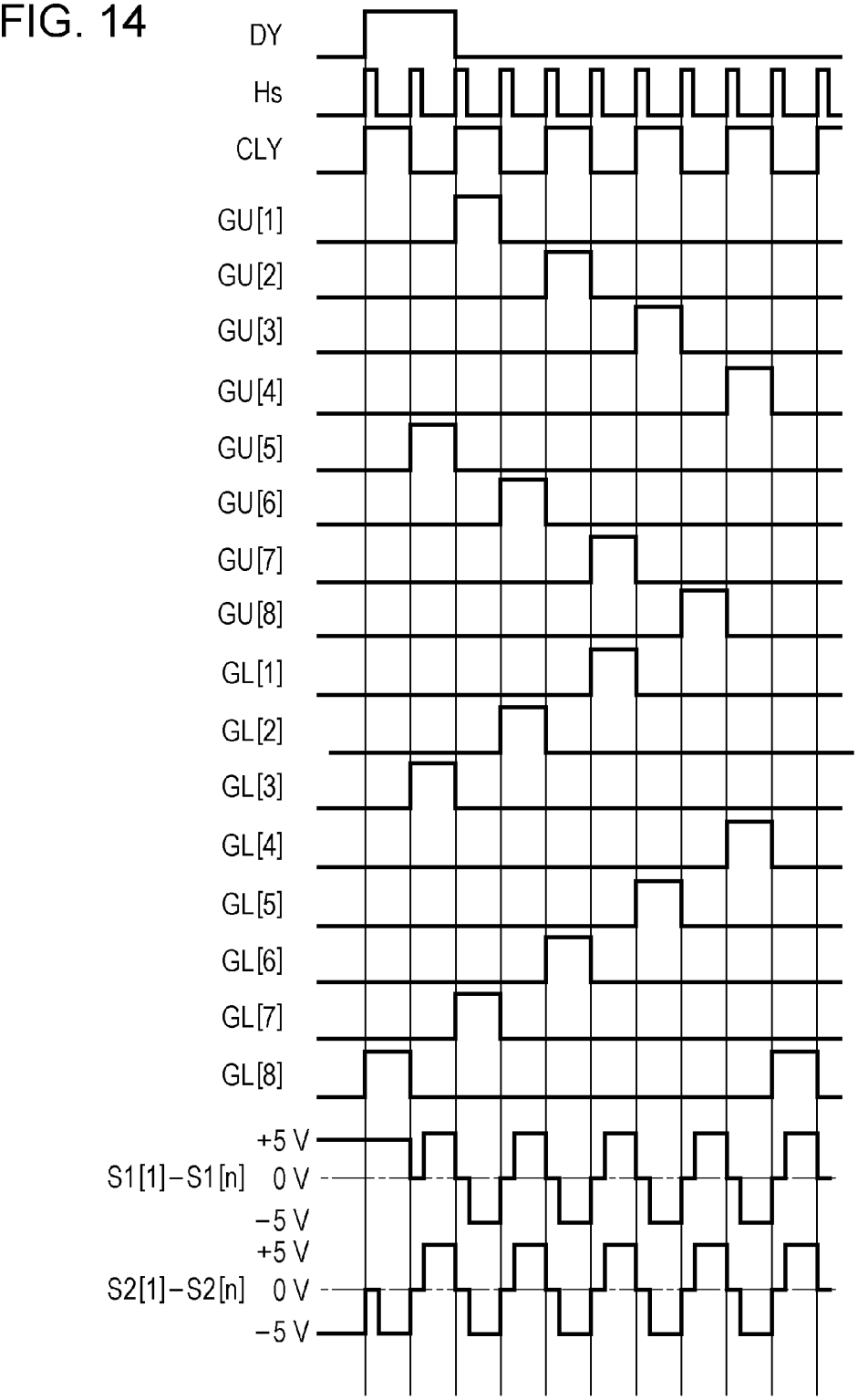
FIG. 14 is a timing chart illustrating the selection timing of the scan signal, the supply timing of the data signal, and the polarity.

In FIG. 13, the spots indicated by the plurality of the thick lines, indicate the occurrence spots of the horizontal electric field in the embodiment. In the case of the embodiment, not only the horizontal electric field occurs only in the same period between the all scan lines, but also the horizontal electric field occurs in the boundary unit of the upper side pixel area 30U and the lower side pixel area 30L, as shown with the spot which is surrounded by the oval of the dotted line in FIG. 13. As a result, since the horizontal electric field occurs not only in the upper side pixel area 30U and the lower side pixel area 30L, but also in the boundary unit of the upper side pixel area 30U and the lower side pixel area 30L, the occurrence amount of the reverse twist domain is made uniform in the whole screen. As a result, the boundary unit of the upper side pixel area 30U and the lower side pixel area 30L, is not emphasized.

Furthermore, in the embodiment, the direction which is from the scan line close to the boundary unit in the upper side pixel area 30U, to the scan line far from the boundary unit, that is, toward the upper direction, the scan line is selected, and the direction which is from the scan line close to the boundary unit in the lower side pixel area 30L, to the scan line far from the boundary unit, that is, toward the lower direction, the scan line is selected. Therefore, the order of the selection is such that the upper scan line as five scan lines, and the lower scan line as four scan lines are alternately selected, in the upper side pixel area 30U, and the lower scan line as five scan lines, and the upper scan line as four scan lines are alternately selected, in the lower side pixel area 30L, per one horizontal scan period. Moreover, the polarity of the data signal which is supplied to the data lines 34a and 34b intersecting with each scan line, is alternately switched between the positive polarity and the negative polarity, per one horizontal scan period. That is, in the embodiment, on the screen which is divided into two, the scan referred to as the so-called region scan, is performed.

Also in the embodiment, by separately performing the scan in the upper side pixel area 30U and the lower side pixel area 30L, the time which is necessary for rewriting of one screen, is finished at 8H which is eight times of one horizontal scan period (1H), and it is possible to rewrite one screen at double speed in comparison with the comparative example shown in FIG. 15. Consequently, the shutter open time of the 3D glasses at the time of driving the active system 3D (three-dimensional display), or, the lighting time of the RGB light source at the time of driving the field sequential, can be secured long.

Moreover, in the embodiment, in the upper side pixel area 30U, the scan is performed in the direction which is from the scan line far form the boundary unit, toward the scan line close to the boundary unit, and even in the lower side pixel area 30L, the scan is performed in the direction which is from the scan line far from the boundary unit, toward the scan line close to the boundary unit. Since the scan direction in the upper side pixel area 30U is the direction which is opposite to the scan direction in the lower side pixel area 30L, it is possible to suppress the luminance difference in the boundary unit of the upper side pixel area 30U and the lower side pixel area 30L.

In the case of the embodiment, in the same manner as the third embodiment, since the region scan described above is performed in each of the upper side pixel area and the lower side pixel area, the period in which the data line has the same polarity, becomes short, and the switching of the polarity can be averagely performed in each of the upper side pixel area and the lower side pixel area. As a result, in each of the upper side pixel area and the lower side pixel area, it is possible to make the leakage current amount of the switching element of the pixel uniform on the whole, and it is possible to suppress the upper and lower luminance difference itself.

According to the embodiment as described above, in the same manner as the third embodiment, it is possible to shorten the time which is necessary for rewriting of one screen, and not only the upper and lower luminance difference itself can be suppressed by the region scan, but also the occurrence amount of the reverse twist domain is the same level in the whole screen, since the horizontal electric field occurs not only in the upper side pixel area 30U and the lower side pixel area 30L, but also in the boundary unit of the upper side pixel area 30U and the lower side pixel area 30L, by shifting the scan start timing in the lower side pixel area 30L. As a result, it is possible to prevent the boundary unit from being emphasized, in comparison with the case of occurring no reverse twist domain only in the boundary unit of the upper side pixel area 30U and the lower side pixel area 30L.

Modification Example

The present invention is not limited to each embodiment described above, and for example, modifications of various kinds described hereinafter, are practicable. Furthermore, needless to say, each embodiment and each modification may be appropriately combined.

(1) In each embodiment described above, as a drive system of the scan line, the drive system indicated by the timing chart of FIG. 5, FIG. 8, FIG. 11, or FIG. 14, is described as an example, but the invention is not limited to the drive system thereof. If it is possible to shorten the time which is necessary for rewriting of one screen, and to suppress the upper and lower luminance difference, and to prevent the boundary unit of the upper side pixel area 30U and the lower side pixel area 30L from being emphasized, the drive system other than this, can be appropriately employed.

(2) In the embodiment described above, the liquid crystal is adopted as an example of an electro-optical material, but the invention is applied to an electro-optical device using the electro-optic material other than the above. The electro-optical material is a material whose optical properties such as transmittance or luminance vary by the supply of an electrical signal (current signal or voltage signal). For example, in the same manner as the embodiments described above, the invention can be applied with respect to the electro-optical devices of various kinds such as a display panel using a light emitting element such as organic EL (ElectroLuminescent), inorganic EL, and a light emitting polymer, an electrophoresis display panel using a microcapsule including a colored liquid and white particles dispersed in the liquid, as an electro-optical material, a twist ball display panel using twist balls which are painted dividing into a different color per the region whose the polarity differs, as an electro-optical material, a toner display panel using a black toner as an electro-optical material, or a plasma display panel using high pressure gas such as helium and neon, as an electro-optical material.

Application Example

Figure 20:
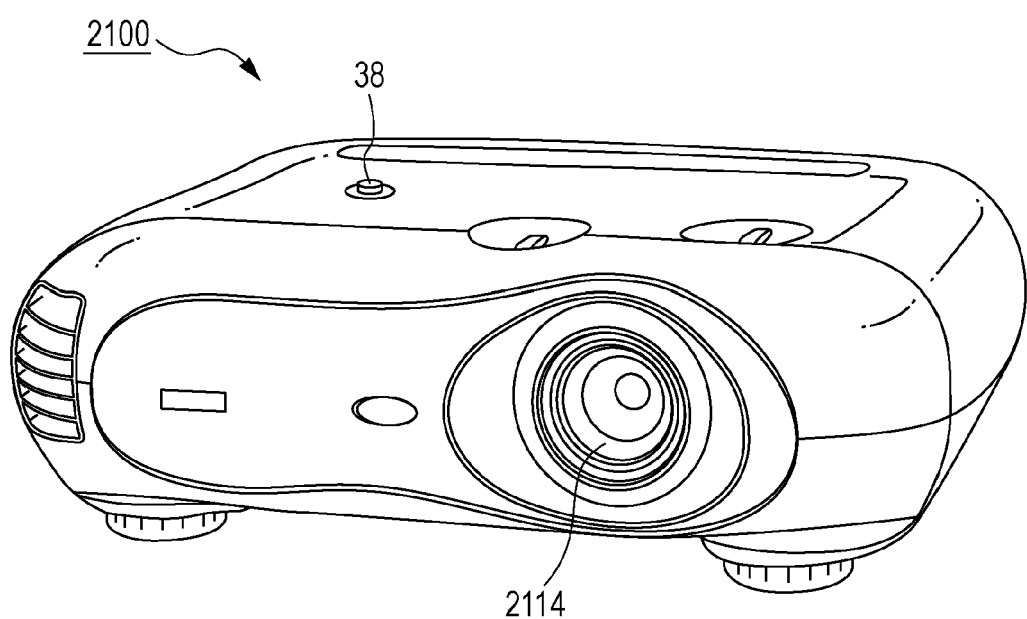
FIG. 20 is an explanatory diagram illustrating an example of an electronic apparatus.
Figure 21:
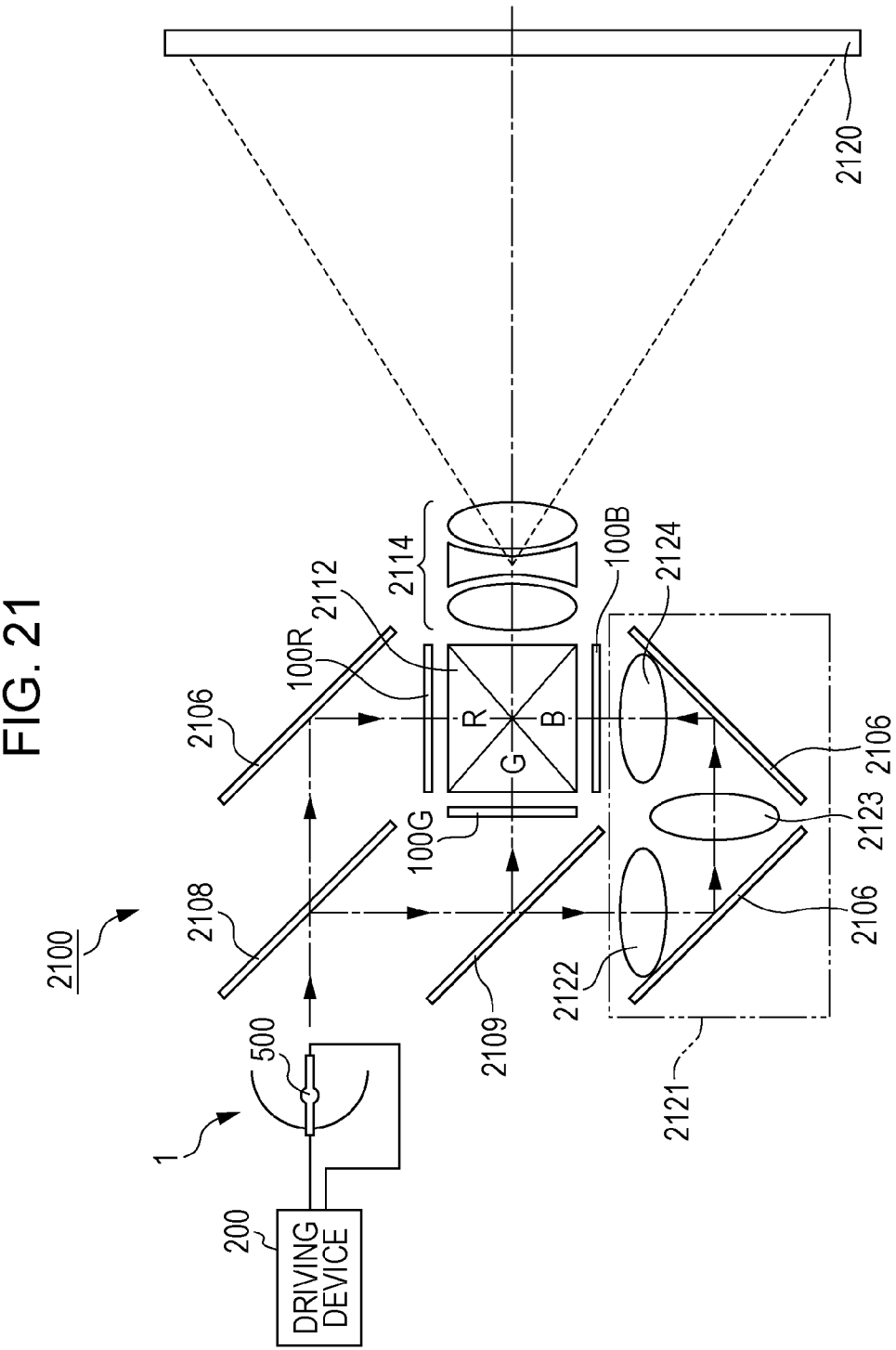
FIG. 21 is an explanatory diagram illustrating another example of the electronic apparatus.

The invention can be used in electronic apparatuses of various kinds. FIG. 20 and FIG. 21 are diagrams exemplifying a concrete form of an electronic apparatus which is an application target of the invention.

FIG. 20 is a diagram illustrating an example of an appearance configuration of a projector using the liquid crystal display device of the invention. As shown in FIG. 20, a projector 2100 is a stationary type. In front thereof, a projection lens 2114 for projecting video is installed, and on a top plate thereof, a push-on type switch 38 that instructs an input and a cut off of power supply is installed.

FIG. 21 is a plan view illustrating an example of an optical configuration of the projector 2100. As shown in FIG. 21, the projector 2100 is a so-called three-plate type, using transmission type liquid crystal light valves 100R, 100G, and 100B. In the liquid crystal light valves 100R, 100G, and 100B, the liquid crystal display device 100 of the invention is used.

Inside the projector 2100, a light source device 1 is installed, an alternating current is supplied to a discharge lamp 500 from a drive device 200, and a white light is emitted from the discharge lamp 500, and is shot out by an optical member such as a main reflection mirror in the three o'clock direction in the drawing. The white light which is shot out, is separated into three primary colors of R (red), G (green), and B (blue), by three sheets of mirror 2106, and dichroic mirrors 2108 and 2109 which are arranged inside, and is incident to the liquid crystal light valves 100R, 100G, and 100B corresponding to each primary color, respectively. In detail, among the white light which is incident from nine o'clock direction in the drawing, the dichroic mirror 2108 transmits the light of a wavelength region of R, and reflects the light of the wavelength region of the rest G and B, in the six o'clock direction. Among the light of the wavelength region of G and B which are incident from the twelve o'clock direction, the dichroic mirror 2109 transmits the light of the wavelength region of B, and reflects the light of the wavelength region of G, other than the above, in the three o'clock direction. Furthermore, if B is compared with R and G, a light path is long, and thus, in order to prevent the loss thereof, it is guided through a relay lens system 2121 which is made up of an incidence lens 2122, a relay lens 2123, and an emission lens 2124.

In the projector 2100, video signals corresponding to each of the colors R, G, and B, are supplied from an upper position circuit which is not shown in the drawing, respectively, and each of the liquid crystal light valves 100R, 100G, and 100B are driven by the video signals corresponding to each of R, G, and B, respectively. Hereby, the light which is incident to the liquid crystal light valves 100R, 100G, and 100B, is emitted by modulating the transmittance per each pixel. That is, the liquid crystal light valves 100R, 100G, and 100B, functions as a modulation device that modulates the light shot out from the discharge lamp 500, on the basis of the video signal (image information).

The light which is modulated by the liquid crystal light valves 100R, 100G, and 100B, respectively, is incident to a dichroic prism 2112 from three directions. Therefore, in the dichroic prism 2112, the light of R and B is refracted at 90 degrees, on the other hand, the light of G goes straight. Accordingly, after the modulated light of each color is composed, a color image is projected on a screen 2120 by the projection lens 2114. The optical systems functions as a projection device that projects the light modulated by the liquid crystal light valves 100R, 100G, and 100B, respectively.

Furthermore, in the liquid crystal light valves 100R, 100G, and 100B, since the light corresponding to each of R, G, and B is incident, by the dichroic mirror 2108, a color filter is not installed as a direct viewing type. Moreover, an transmission image of the liquid crystal light valves 100R and 100B is projected after being reflected by the dichroic prism 2112, on the contrary thereto, the transmission image of the liquid crystal light valve 100G is intactly projected, and thus, the horizontal scan direction by the liquid crystal light valves 100R and 100B, is the direction opposite to the horizontal scan direction by the liquid crystal light valve 100G, and a left and right inverted image is created.

In the projector 2100 as described above, in the liquid crystal light valves 100R, 100G, and 100B, the liquid crystal display device 100 of the invention is used. Therefore, it is possible to provide the projector of high image quality without the upper and lower luminance unevenness.

Furthermore, as the electronic apparatus to which the invention is applied, in addition to the device illustrated in FIG. 20 and FIG. 21, a portable information terminal (PDA: Personal Digital Assistants), a digital still camera, a television, a video camera, a car navigation device, an on-vehicle display device (instrument panel), an electronic notebook, an electronic paper, a calculator, a word processor, a workstation, a TV telephone, a POS terminal, a printer, a scanner, a copying machine, a video player, an apparatus including a touch panel and the like, are exemplified.

This application claims priority to Japan Patent Application No. 2013-227962 filed Nov. 1, 2013, the entire disclosures of which are hereby incorporated by reference in their entireties.

What is claimed is:

1. A liquid crystal display device comprising:
   a liquid crystal display panel that has a first region and a second region;
   the first to the m-th scan lines that are arranged in the first region;
   the m+1-th to the 2m-th scan lines that are arranged in the second region;
   n data lines intersecting with the scan lines which are arranged in the first region;
   n data lines intersecting with the scan lines which are arranged in the second region;
   pixels that are installed to correspond to intersection of the scan lines and the data lines respectively, in each of the first region and the second region;
   a first scan line drive circuit that drives from the first to the m-th scan lines;
   a second scan line drive circuit that drives from the m+1-th to the 2m-th scan lines;
   a first data line drive circuit that drives the data line intersecting with the first to the m-th scan lines; and
   a second data line drive circuit that drives the data line intersecting with the m+1-th to the 2m-th scan lines,
   wherein the first scan line drive circuit supplies an active scan signal to each scan line while skipping a portion of a plurality of the scan lines, per one horizontal scan period, in a direction of the first to the m-th scan lines, or in a direction of the m-th to the first scan lines,
   the second scan line drive circuit supplies the active scan signal to each scan line while skipping the portion of the plurality of the scan lines, per one horizontal scan period, in a direction of the 2m-th to the m+1-th scan lines which is a direction opposite to the supply direction of the scan signal to the scan line by the first scan line drive circuit, or in a direction of the m+1-th to the 2m-th scan lines, and
   the first data line drive circuit and the second data line drive circuit synchronize with a timing of supplying the active signal by the first scan line drive circuit and the second scan line drive circuit, and supply a data signal whose polarity is inverted to a positive polarity potential and a negative polarity potential per one horizontal scan period, to the data line.

2. The liquid crystal display device according to claim 1, wherein the second scan line drive circuit moves the timing of supplying the active scan signal to each scan line while skipping the portion of the plurality of the scan lines, in the direction of the 2m-th to the m+1-th scan lines, or in the direction of the m+1-th to the 2m-th scan lines, before or after as only two horizontal scan periods from the timing of supplying the active scan signal to each scan line while skipping the portion of the plurality of the scan lines by the first scan line drive circuit, in the direction of the first to the m-th scan lines, or in the direction of the m-th to the first scan lines.

3. An electronic apparatus comprising:
   the liquid crystal display device according to claim 2.

4. The liquid crystal display device according to claim 1, wherein the first data line drive circuit drives the data lines in order of the first to the n-th data lines, in the first region,
   the second data line drive circuit drives the data lines in order of the first data line corresponding to the first data line of the first region to the n-th data line corresponding to the n-th data line of the first region, in the second region, and
   the data signal having the same polarity is supplied to the data line corresponding to the first region and the second region.

5. An electronic apparatus comprising:
   the liquid crystal display device according to claim 4.

6. An electronic apparatus comprising:
   the liquid crystal display device according to claim 1.

7. A method for driving a liquid crystal display device, which includes a liquid crystal display panel that has a first region and a second region, the first to the m-th scan lines that are arranged in the first region, the m+1-th to the 2m-th scan lines that are arranged in the second region, n data lines intersecting with the scan lines which are arranged in the first region, n data lines intersecting with the scan lines which are arranged in the second region, pixels that are installed to correspond to intersection of the scan lines and the data lines respectively, in each of the first region and the second region, a first scan line drive circuit that drives from the first to the m-th scan lines, a second scan line drive circuit that drives from the m+1-th to the 2m-th scan lines, a first data line drive circuit that drives the data line intersecting with the first to the m-th scan lines, and a second data line drive circuit that drives the data line intersecting with the m+1-th to the 2m-th scan lines,
   the method comprising:
   supplying an active scan signal to each scan line while skipping a portion of a plurality of the scan lines, per one horizontal scan period, in a direction of the first to the m-th scan lines, or in a direction of the m-th to the first scan lines, by the first scan line drive circuit;
   supplying the active scan signal to each scan line while skipping the portion of the plurality of the scan lines, per one horizontal scan period, in a direction of the 2m-th to the m+1-th scan lines which is a direction opposite to the supply direction of the scan signal to the scan line by the first scan line drive circuit, or in a direction of the m+1-th to the 2m-th scan lines, by the second scan line drive circuit; and
   synchronizing with a timing of supplying the active signal by the first scan line drive circuit and the second scan line drive circuit, and supplying a data signal whose polarity is inverted to a positive polarity potential and a negative polarity potential per one horizontal scan period, to the data line, by the first data line drive circuit and the second data line drive circuit.

* * * * *